United States Patent
Shibuya et al.

(10) Patent No.: US 9,310,525 B2
(45) Date of Patent: Apr. 12, 2016

(54) ANTIREFLECTION FILM AND OPTICAL DEVICE

(75) Inventors: Minoru Shibuya, Saitama (JP); Terufusa Kunisada, Saitama (JP); Naoki Yamashita, Saitama (JP)

(73) Assignee: Tamron Co., Ltd., Saitama (JP)

( * ) Notice: Subject to any disclaimer, the term of this patent is extended or adjusted under 35 U.S.C. 154(b) by 1038 days.

(21) Appl. No.: 13/434,111

(22) Filed: Mar. 29, 2012

(65) Prior Publication Data

US 2012/0251803 A1    Oct. 4, 2012

(30) Foreign Application Priority Data

Mar. 30, 2011 (JP) ................................ 2011-074496
Apr. 18, 2011 (JP) ................................ 2011-091705

(51) Int. Cl.
 *B32B 3/26* (2006.01)
 *B32B 7/02* (2006.01)
 *G02B 1/11* (2015.01)

(52) U.S. Cl.
 CPC ........... *G02B 1/11* (2013.01); *Y10T 428/24942* (2015.01)

(58) Field of Classification Search
 CPC ................. G02B 1/10–1/18; Y10T 428/24942
 USPC ................. 428/141–145, 148–149, 212–213, 428/215–220, 323–336
 See application file for complete search history.

(56) References Cited

U.S. PATENT DOCUMENTS

| | | | | |
|---|---|---|---|---|
| 6,166,855 A | * | 12/2000 | Ikeyama et al. | 359/580 |
| 2007/0047087 A1 | * | 3/2007 | Fukuda et al. | 359/582 |
| 2008/0002259 A1 | * | 1/2008 | Ishizawa et al. | 359/581 |
| 2009/0220774 A1 | | 9/2009 | Imai et al. | |
| 2010/0118406 A1 | | 5/2010 | Kobori et al. | |

FOREIGN PATENT DOCUMENTS

| | | | |
|---|---|---|---|
| CN | 101784916 A | 7/2010 | |
| JP | 2004258267 A | * 9/2004 | ............... G02B 1/11 |
| JP | 2006215542 A | 8/2006 | |
| JP | 2007052345 A | 3/2007 | |

(Continued)

OTHER PUBLICATIONS

Machine translation of JP2004-258267. Retrieved Jun. 2, 2015.*

(Continued)

*Primary Examiner* — Prashant J Khatri
(74) *Attorney, Agent, or Firm* — The Webb Law Firm

(57) ABSTRACT

An object of the present invention is to provide an antireflection film and an optical device having excellent antireflection characteristics against a light beam having a wide wavelength range at a wide range of an incident angle, and also having practically sufficient durability. To achieve the above object, the present invention adopts an antireflection film having an optical two-layer structure composed of an intermediate layer provided on a base material and a low refractive index layer provided on a surface of the intermediate layer, wherein the low refractive index layer is a layer obtained by binding hollow silica by a binder, a refractive index n(1) thereof is between 1.15 and 1.24 inclusive, and a refractive index n(2) of the intermediate layer satisfies a relation in the expression (1) below assuming a refractive index of the base material n(sub).

$$n(1) \times \sqrt{n(\text{sub})} \times 0.930 \leq n(2) \leq n(1) \times \sqrt{n(\text{sub})} \times 0.985 \qquad (1).$$

11 Claims, 15 Drawing Sheets

(56) References Cited

FOREIGN PATENT DOCUMENTS

| | | |
|---|---|---|
| JP | 2008040171 A | 2/2008 |
| JP | 2009237551 A | 10/2009 |
| JP | 201038948 A | 2/2010 |
| JP | 2010113310 A | 5/2010 |

OTHER PUBLICATIONS

Dobrowolski, J.A. (eds. Bass et al.). "Optical Properties of Films and Coatings". Handbook of Optics: vol. I, Fundamentals, Techniques, and Design, (1995); pp. 42.3-42.130.*

Takaaki Tamada et al., "The development of high efficiency antireflection coating "Aero Bright Coating" using porous silica", pp. 67-70, Jul. 2010, The Optical Society of Japan, Japan.

* cited by examiner

ANTIREFLECTION FILM AND OPTICAL DEVICE

BACKGROUND OF THE INVENTION

1. Field of the Invention

The present invention relates to an antireflection film provided on the surface of a base material, and more particularly, to an antireflection film and an optical device having excellent antireflection characteristics against a light beam having a wide wavelength range at a wide range of an incident angle.

2. Description of the Related Art

Antireflection films are provided on the surfaces of the base materials for an optical device such as a lens, a prism or the like constituting optical equipments to improve a transmittance of a light. Most of conventional optical equipments have been equipment suitable to a visible range light beam incident at a particular narrow range of an incident angle. Thus, the antireflection films provided on the optical devices have been designed to perform an excellent antireflection effect at the particular narrow range of an incident angle.

However, optical equipments applicable to a light beam incident at a wide range of an incident angle are increasing in the recent years. Thus, there is a demand for an excellent antireflection effect against a light beam incident at a wide range of an incident angle over the whole visible range. Lenses used in optical equipments for image-pickup such as a camera also tends to be a higher numerical aperture in response to a demand for size reduction and higher performance. For example, when the numerical aperture of an objective lens of a camera increases, curvature of the lens increases also, and the incident angle of a light beam on a lens peripheral portion also increases. As a result, ghost or the like is easily generated due to reflection at the lens peripheral portion. Thus, there is also a demand for an excellent antireflection effect against a light beam incident at a wider range of an incident angle over the whole visible range.

For example, Japanese Patent Laid-Open No. 2006-215542 discloses an antireflection film composed of three layers laminated, a dense layer containing alumina as a main component, a dense layer having a refractive index of 1.33 to 1.50 and a porous layer composed of an aggregated nanoparticles of mesoporous silica and having a refractive index of 1.07 to 1.18 in this order from a base material side. The antireflection film disclosed in Japanese Patent Laid-Open No. 2006-215542 performs excellent antireflection characteristics over a wavelength range of 400 nm to 700 nm, the wavelength range of visible light.

Japanese Patent Laid-Open No. 2010-38948 also discloses an antireflection film having a two-layer structure composed of a dense layer and porous layer of a silica aerogel in this order from a base material side. In the antireflection film disclosed in Japanese Patent Laid-Open No. 2010-38948, a refractive index is gradually reduced from the base material to porous layer of the silica aerogel. As a result, it is demonstrated that the antireflection film is excellent in antireflection characteristics against a light beam having a wide wavelength range at a wide range of an incident angle.

However, even the antireflection film disclosed in Japanese Patent Laid-Open No. 2006-215542 achieves a reflectance of 1% or less against a light beam having a wavelength range of 400 nm to 700 nm when the light beam has an incident angle of 30°, further low reflectance is required. In a lens or the like used in recent optical equipments, the incident angle of a light beam sometimes exceeds 30°, and the light beam has a wider wavelength range. Thus, such antireflection film cannot achieve a sufficient antireflection effect against a light beam having a wider wavelength range at a wider range of an incident angle, and insufficient effect on reduction of a ghost or the like may be supposed. Moreover, the shape or the property of the base material may be affected by heat because a firing process at 300° C. or more is required to form the porous layer of mesoporous nanosilica.

In the antireflection film disclosed in Japanese Patent Laid-Open No. 2010-38948, porous layer of the silica aerogel is provided as a surface layer. When porous layer of the silica aerogel is formed to have a refractive index of 1.15 on the surface of a $SiO_2$ layer as the dense layer, drawback that durability in a practical use cannot be achieved due to the inherent property of silica aerogel may occur. In addition, the silica aerogel changes its structure by water adsorption. When the silica aerogel is subjected to hydrophobic treatment using fluoride to prevent water adsorption, the porous layer of the silica aerogel increases a refractive index. Then, for example, it has been reported that when particles of silica aerogel are bonded together by using a binder in the process for formation of porous layer of the silica aerogel to achieve durability in a practical use, a refractive index of the porous layer of the silica aerogel comes to about 1.25 (see "35th Optical Symposium Proceedings," P67-P70, July 2010, sponsored by the Optical Society of Japan (an affiliate of the Japan Society of Applied Physics), for example).

So, an object of the present invention is to provide an antireflection film and an optical device excellent in antireflection characteristics against a light beam having a wide wavelength range at a wide range of an incident angle, and also having sufficient durability in a practical use.

SUMMARY OF THE INVENTION

As a result of intense study, the present inventors have achieved the above object by employing an antireflection film and an optical device as described below.

An antireflection film according to the present invention is an antireflection film to be provided on a base material, comprising an optical two-layer structure composed of an intermediate layer provided on the base material and a low refractive index layer provided on a surface of the intermediate layer, wherein the low refractive index layer is a layer obtained by binding a hollow silica by a binder having a refractive index n(1) of between 1.15 and 1.24 inclusive, and a refractive index n(2) of the intermediate layer satisfies a relation in an expression (1) below assuming a refractive index of the base material n(sub).

$$n(1) \times \sqrt{n(\mathrm{sub})} \times 0.930 \leq n(2) \leq n(1) \times \sqrt{n(\mathrm{sub})} \times 0.985 \qquad (1)$$

In the antireflection film according to the present invention, occupied volume of the hollow silica in the low refractive index layer is between 30% by volume to 99% by volume inclusive. In this case, the occupied volume of the hollow silica means a volume occupied by whole hollow silica respectively including a hollow portion in the low refractive index layer. The hollow silica preferably occupies 90% by volume or less, and more preferably 60% by volume or more of the volume of the low refractive index layer.

In the antireflection film according to the present invention, a void portion is provided in the low refractive index layer in addition to a hollow portion in the hollow silica.

In the antireflection film according to the present invention, an average particle size of the hollow silica particles is preferably between 5 nm to 100 nm inclusive, and outer sides of the hollow silica particles are coated with the binder.

In the antireflection film according to the present invention, the refractive index n(1) of the low refractive index layer is preferably between 1.17 and 1.23 inclusive.

In the antireflection film according to the present invention, the refractive index n(2) of the intermediate layer preferably satisfy an expression (2) below.

$$n(1) \times \sqrt{n(\text{sub})} \times 0.940 \leq n(2) \leq n(1) \times \sqrt{n(\text{sub})} \times 0.970 \qquad (2)$$

In the antireflection film according to the present invention, an optical film thickness of the low refractive index layer is preferably between 100 nm to 180 nm inclusive.

In the antireflection film according to the present invention, an optical film thickness of the intermediate layer is preferably between 100 nm to 180 nm inclusive.

In the antireflection film according to the present invention, the intermediate layer is preferably an equivalent stack having a multi-layer structure that satisfies the relation in the expression (1) at a reference wavelength. The reference wavelength may be any wavelength defined over a range of 400 nm to 700 nm.

In the antireflection film according to the present invention, the low refractive index layer is preferably a layer formed by using the hollow silica, and a resin material or metal alkoxide as a binder component.

In the antireflection film according to the present invention, a reflectance against a light beam having a wavelength of 400 nm to 800 nm inclusive at an incident angle of 0° is preferably 0.5% or less, and a reflectance against a light beam having a wavelength of 400 nm to 680 nm inclusive at an incident angle of 45° or less is preferably 0.7% or less.

In the antireflection film according to the present invention, a functional layer having a refractive index n(3) of 1.30 to 2.35 inclusive and a film thickness of 1 nm to 30 nm is preferably provided on a surface of the low refractive index layer.

In the antireflection film according to the present invention, the base material is preferably a base material for an optical device.

An optical device according to the present invention is characterized in provided with the antireflection film described above.

According to the present invention, the antireflection film excellent in antireflection characteristics against a light beam having a wide wavelength range at a wide range of an incident angle, and also having practically sufficient durability can be provided by making the antireflection film comprise the two-layer structure composed of the low refractive index layer obtained by binding the hollow silica by the binder and having a refractive index n(1) of 1.15 to 1.24 inclusive, and the intermediate layer having the refractive index n(2) that satisfies the relation in the expression (1) assuming a refractive index of the base material n(sub).

DETAILED DESCRIPTION OF THE PREFERRED EMBODIMENTS

Figure 1:
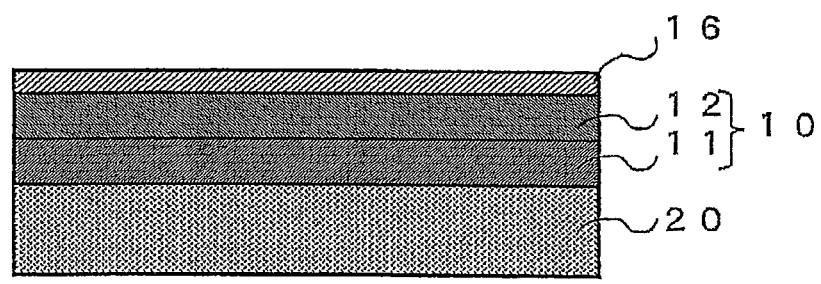
FIG. 1 is a schematic view illustrating the layer structure of an antireflection film according to the present invention.

In the following, an embodiment of an antireflection film and an optical device according to the present invention will be described.

1. Antireflection Film 10

First, the structure of an antireflection film 10 according to the present invention will be described by reference to FIG. 1. The antireflection film 10 according to the present invention is the antireflection film 10 to be provided on a base material 20, comprising an optical two-layer structure composed of an intermediate layer 11 provided on the base material 20 and a low refractive index layer 12 provided on the surface of the intermediate layer 11, wherein the low refractive index layer 12 is a layer obtained by binding the hollow silica (hollow silica particles) 13 by a binder 14 and a refractive index n(1) of between 1.15 and 1.24 inclusive, and a refractive index n(2) of the intermediate layer 11 satisfies a relation in an expression (1) below assuming a refractive index of the base material n(sub). In other words, main optical structure of the antireflection film 10 according to the present invention is an optical two-layer structure composed of the low refractive index layer 12 as a surface layer and the intermediate layer 11 arranged between the surface layer and the base material 20. The antireflection film may be composed of just the two-layer structure, or a functional layer 16 described below may also be provided on the surface of the antireflection film unless which affect the antireflection effect of the antireflection film.

$$n(1) \times \sqrt{n(\text{sub})} \times 0.930 \leq n(2) \leq n(1) \times \sqrt{n(\text{sub})} \times 0.985 \qquad (1)$$

(1) Antireflection Effect Performed by the Optical Two-layer Structure

First, the antireflection effect by the optical two-layer structure will be described. In general, when the refractive index of the low refractive index layer 12 provided as the surface layer is n(1), the refractive index of the intermediate layer 11 provided between the base material 20 and the surface layer is n(2), and assuming a refractive index of the base material 20 n(sub), it is known that the antireflection film 10 has a minimum reflectance against incident light having a reference wavelength (any wavelength defined over a range of 400 nm to 700 nm) when the refractive index n(2) of the intermediate layer 11 satisfies a relation in an expression (3) below.

$$n(1) \times \sqrt{n(\text{sub})} = n(2) \qquad (3)$$

However, although the reflectance against the incident light having the reference wavelength has a minimum value when the refractive index n(2) of the intermediate layer 11 satisfies the relation in the expression (3) to the refractive index n(1) of the low refractive index layer 12 and the refractive index n(sub) of the base material 20, the reflectance increases in a U-shape as the wavelength of the incident light goes away from the reference wavelength. Thus, when the refractive index n(2) of the intermediate layer 11 of the antireflection film 10 is optically designed according to the expression (3), the antireflection effect cannot be achieved over the whole wavelength range of incident light having a wide wavelength range. Then, in the antireflection film 10 according to the present invention, the refractive index n(2) of the intermediate layer 11 is made satisfy the relation in the expression (1) regarding to the refractive index n(1) of the low refractive index layer 12 and the refractive index n(sub) of the base material 20 to solve the problem, even the reflectance against the incident light having the reference wavelength is slightly higher than that according to the expression (3), a reflectance equal to or less than a required level can be achieved over the whole wavelength range. That is, a low reflectance can be achieved over the whole wavelength range of incident light even when the incident light has a wide wavelength range by optically designing the refractive index n(2) of the intermediate layer 11 to satisfy the relation in the expression (1).

In the present invention, to achieve a lower reflectance over an whole wavelength range against a incident light having a wider wavelength range, the refractive index n(2) of the intermediate layer 11 more preferably satisfies an expression (2) below.

$$n(1) \times \sqrt{n(\text{sub})} \times 0.940 \leq n(2) \leq n(1) \times \sqrt{n(\text{sub})} \times 0.970 \qquad (2)$$

(2) Low Refractive Index Layer 12

Next, the low refractive index layer 12 constituting the surface layer of the optical two-layer structure will be described. First, the refractive index of the low refractive index layer 12 will be described. As described above, the refractive index of the low refractive index layer 12 is required to be between 1.15 and 1.24 inclusive. Only when the low refractive index layer 12 having a refractive index in the above range is provided as the surface layer and the intermediate layer 11 having the refractive index n(2) that satisfies the expression (1) is provided on the base material 20, the antireflection film 10 having the optical two-layer structure can achieve a high antireflection effect against a light beam having a wide wavelength range.

When the refractive index of the low refractive index layer 12 is made less than 1.15, the hollow silica 13 cannot be coated with the binder 14 not to enable sufficiently bind the hollow silica 13 in a state coated with the binder 14. Thus, the refractive index of the low refractive index of less than 1.15 in the layer 12 is not preferable since the low refractive index layer 12 is poor in mechanical strength and durability. From the above viewpoint, the refractive index of the low refractive index layer 12 is more preferably 1.17 or more. In contrast, the refractive index of the low refractive index layer 12 exceeding 1.24 is also not preferable since the reflectance at the reference wavelength increases. From the above viewpoint, the low refractive index layer 12 preferably has a lower refractive index in the above range, and more preferably, has a refractive index of 1.23 or less.

Figure 2A:
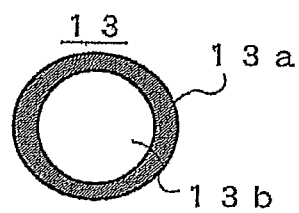
FIG. 2(A) is a schematic view illustrating the structure of hollow silica as a constituent material of a low refractive index layer.

As described above, the low refractive index layer 12 is a layer in which the hollow silica 13 is bound by the binder 14 and is a composite layer including the hollow silica 13 and the binder 14. In the present invention, the hollow silica 13 indicates silica particles having a balloon structure (a hollow structure). That is, as schematically shown in FIG. 2(A), the hollow silica 13 is composed of an outer shell portion 13a made of silica, and a hollow portion 13b surrounded by the outer shell portion 13a. In the present invention, the refractive index of the low refractive index layer 12 can be made lower than the refractive index (1.48) of silica itself because the hollow silica 13 having the hollow portion 13b is employed as a main constituent of the low refractive index layer 12. Also, the mechanical strength and the durability of the low refractive index layer 12 can be maintained by employing the layer obtained by binding the hollow silica 13 by the binder 14 as shown in FIG. 2(B) even when the low refractive index layer 12 has a refractive index in the above range when compared to the low refractive index layer 12 composed of an aggregated porous silica having a plurality of pores in the particles.

Figure 2B:
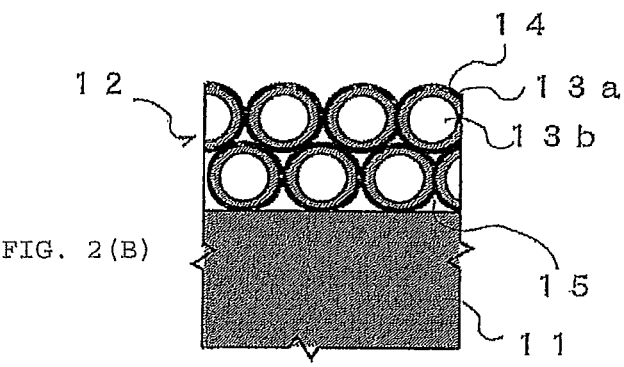
FIG. 2(B) is a schematic view illustrating the structure of the low refractive index layer.
Figure 3A:
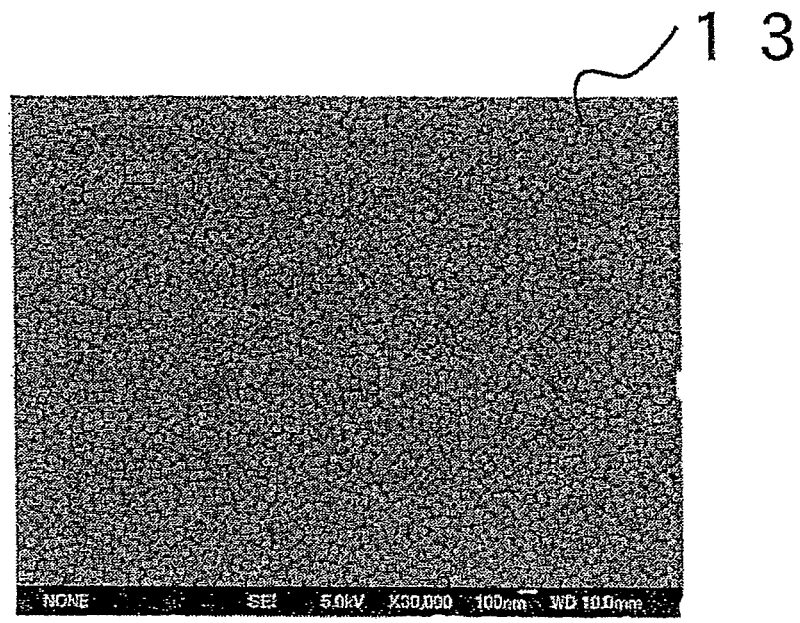
FIG. 3(A) is an SEM photograph showing the surface of the low refractive index layer of the antireflection film according to the present invention.
Figure 3B:
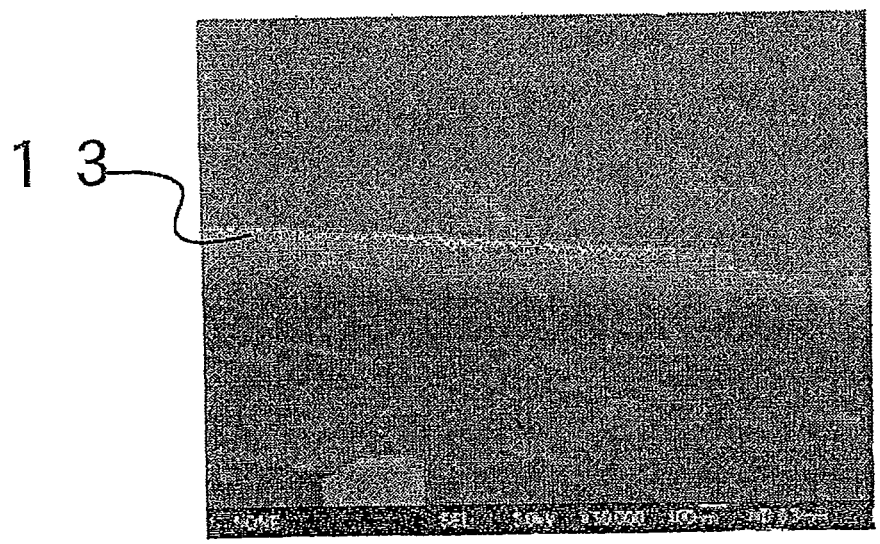
FIG. 3(B) is an SEM photograph showing the cross-section of the antireflection film.
Figure 4:
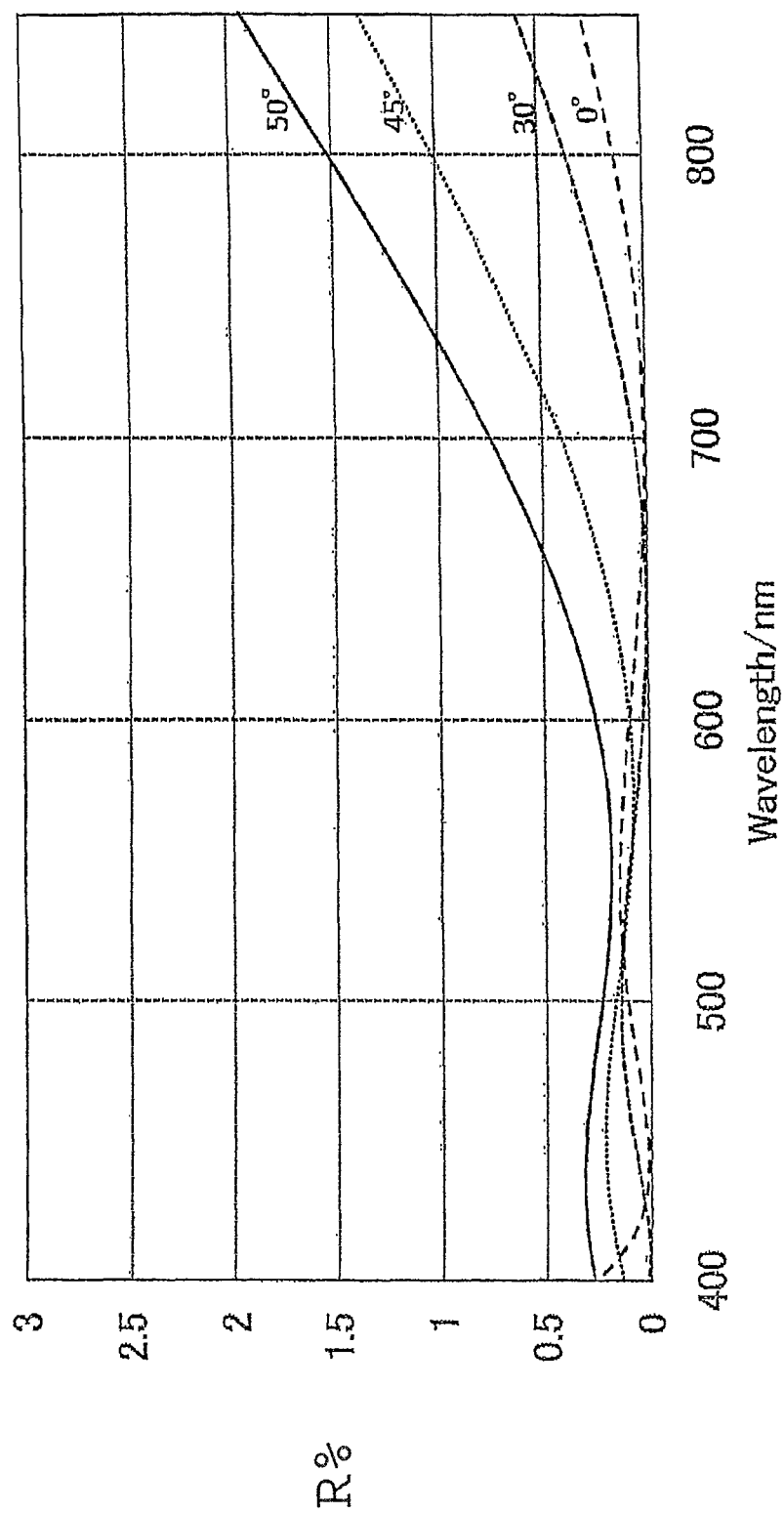
FIG. 4 is a graph showing the reflection characteristics of an antireflection film prepared in the Example 1.
Figure 5:
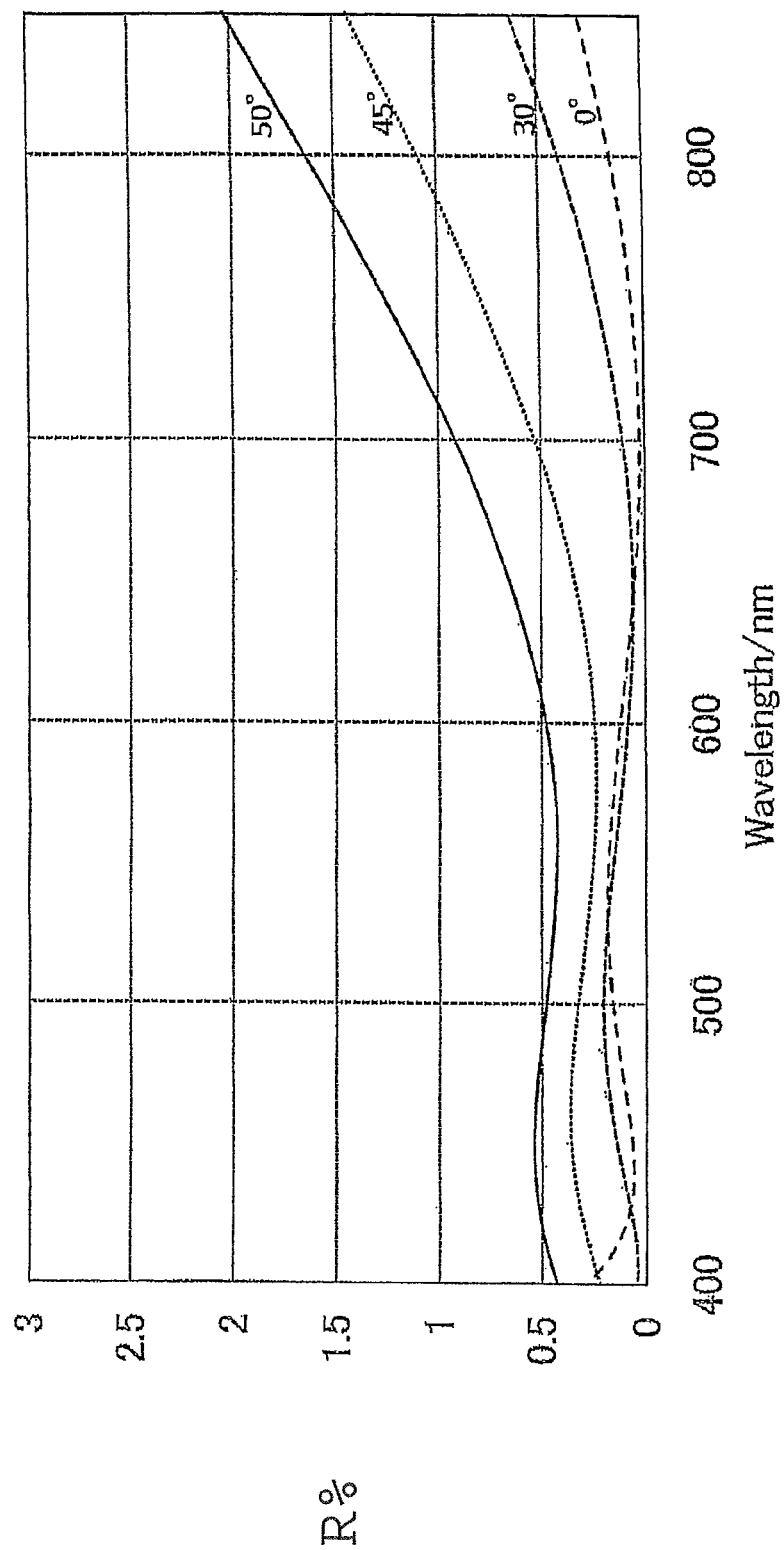
FIG. 5 is a graph showing the reflection characteristics of an antireflection film prepared in the Example 2.

A void portion 15 is provided in the low refractive index layer 12 in addition to a hollow portion 13b in the hollow silica 13 as shown in FIGS. 2(B), 3(A) and 3(B). When the void portion 15 is provided in the low refractive index layer 12 in addition to the hollow portion 13b in the hollow silica 13, the refractive index of the low refractive index layer 12 can be further reduced from the refractive index of silica itself. As a result, the refractive index of the low refractive index layer 12 can be reduced to a lower value over the above range. Note that spherical particles observed in countless numbers are the hollow silica 13 bound by the binder 14 in FIGS. 3(A) and 3(B).

The occupied volume of the hollow silica 13 in the low refractive index layer 12 is preferably between 30% by volume to 99% by volume inclusive. The volume occupied by the hollow silica 13 indicates the sum volume of hollow silica including the outer shell portion 13a of the hollow silica 13 and the hollow portion 13b surrounded by the outer shell portion 13a in the low refractive index layer 12. When the volume occupied by the hollow silica 13 is less than 30% by volume in the low refractive index layer 12, it is not preferable since the durability of the low refractive index layer 12 is made poor. In addition, when the volume occupied by the hollow silica 13 is less than 30% by volume, the volume ratio of the binder 14 in the low refractive index layer 12 increases. As a result, it may be sometimes made difficult for the low refractive index layer 12 to have a refractive index over the above range. From the above viewpoints, the hollow silica 13 is more preferable to occupy 60% by volume or more of the volume in the low refractive index layer 12. In contrast, when the volume occupied by the hollow silica 13 exceeds 99% by volume in the low refractive index layer 12, the volume ratio of the binder 14 for binding the hollow silica 13 together is too low to make the binder 14 bind the hollow silica 13 together sufficiently for forming of the low refractive index layer 12 difficult. The void portion 15 cannot be provided in addition to the hollow portion in the hollow silica also. From the view point of sufficiently binding the hollow silica 13 together and increasing the ratio of the void portion 15 existing in the low refractive index layer 12, it is more preferable that the hollow silica 13 occupies 90% by volume or less in the volume of the low refractive index layer 12.

In the present invention, the outer surface of the hollow silica 13 is preferably coated with the binder 14. When the hollow silica 13 is bound together by the binder 14 at the outer surface of the hollow silica 13 being coated with the binder 14, adhesion with the intermediate layer 11 is enhanced, and the durability of the low refractive index layer 12 is also improved. Since the outer surface of the hollow silica 13 is coated with the binder 14, adsorption of water or other liquids to the hollow portion 13b in the hollow silica 13 and the void portion 15 in the low refractive index layer 12 can be prevented.

An average particle size of the hollow silica (the hollow silica particles) 13 is preferably 5 nm to 100 nm inclusive. When the average particle size is less than 5 nm, it makes providing of the void portion 15 in addition to the hollow portion 13b of the hollow silica 13 in the low refractive index layer 12 difficult. In contrast, when the average particle size of the hollow silica 13 exceeds 100 nm, scattering of the light (haze) occurs. Haze is not preferable since the antireflection film 10 using the hollow silica 13 cannot provide antireflection performance required for an imaging device.

Meanwhile, as a binder component, a resin material or metal alkoxide may be employed. With regard to the resin material, epoxy resin, acrylic resin, fluorine-contained resin, silicone resin, or a monomer compound thereof can be listed. The resin materials are preferably compounds ultraviolet-curing, room temperature-curing, or thermosetting, and more preferably, are compounds ultraviolet-curing or room temperature-curing. When the base material 20 having a high thermal expansion coefficient such as a resin base material is used, the base material 20 can be prevented from deformation due to thermal expansion if formation of the low refractive index layer 12 can be made possible without heat treatment. As a specific method of forming the layer, for example, the materials above and the hollow silica 13 are mixed together, a polymerization initiator, a cross-linking agent or the like are added thereto according to requirement, and is diluted to an appropriate concentration by a solvent or the like to prepare a coating solution. Then, a wet process such as dip coating, spin coating, spraying, roll coating, and screen printing or the like can be employed to apply the coating solution to the surface of the intermediate layer 11 with an appropriate thickness followed by ultraviolet curing or heat treatment for cross-linking polymerization and the solvent is volatilized to form the low refractive index layer 12.

Next, the metal alkoxide is preferably a material which forms a sol by dissolving or suspending the metal alkoxide in a solvent and generates gel by hydrolyzing and polymerizing the sol. For example, it is preferable to use a material which generates silica gel by hydrolysis and polymerization such as alkoxysilane or silsesquioxane. These materials and the hollow silica 13 are dissolved or suspended in a solvent to prepare a sol-gel agent, and the sol-gel agent is applied to the surface of the intermediate layer 11 by spray coating, spin coating, dip coating, flow coating, bar coating or the like. Then, a gel containing the hollow silica is prepared by hydrolysis, and the solvent is volatilized to form the low refractive index layer 12.

An optical film thickness of the low refractive index layer 12 is preferably in the range 100 nm to 180 nm inclusive. Here, the optical film thickness nd (nm) indicates a value obtained by multiplying the refractive index $\underline{n}$ of the layer by a physical film thickness d (nm) (the same applies to the description below). When the optical film thickness of the low refractive index layer 12 is less than 100 nm or exceeds 180 nm, it is not preferable since a desired phase change as the antireflection film is hardly achieved.

When heat treatment is carried out for volatilizing the solvent or for curing to form the low refractive index layer 12, a heat treatment temperature is preferably between 90° C. and 200° C. inclusive, and more preferably 150° C. or less. For example, when the base material 20 made of a material having a relatively high thermal expansion coefficient such as a resin base material is used, the base material 20 can be prevented from deformation due to thermal expansion as long as the heat treatment is carried out in the above temperature range. The same applies to heat treatment carried out in formation of the intermediate layer 11. When the heat treatment is carried out, apparatuses heating the whole base material such as a clean oven or an inert gas oven is more preferably employed than apparatuses which utilizes heat conduction such as a hotplate to uniformly heat the base material, since most of the base materials have a large specific heat.

(3) Intermediate Layer 11

Next, the intermediate layer 11 will be described. The refractive index n(2) of the intermediate layer 11 preferably satisfies the relation in the expression (1), and more preferably satisfies the relation in the expression (2) as described above. The intermediate layer 11 may have a refractive index satisfying the relation in the expression (1), preferably, in the expression (2), and may be formed by using an inorganic material, an organic material, or mixture of inorganic and organic materials. As the inorganic material, $MgF_2$, $SiO_2$, $Al_2O_3$, $Nb_2O_5$, $Ta_2O_5$, $TiO_2$, a mixture of $La_2O_3$ and $TiO_2$, $HfO_2$, $SnO_2$, $ZrO_2$, a mixture of $ZrO_2$ and $TiO_2$, a mixture of $Pr_6O_{11}$ and $TiO_2$, a mixture of $Al_2O_3$ and $La_2O_3$, $La_2O_3$ or the like can be used. As the organic material, epoxy resin, silicone resin, fluorine-contained resin, and PMMA (Poly(methyl methacrylate)) resin or the like can be used. However, a material constituting the intermediate layer 11 is not limited to these materials. Next, the thickness or the like of the intermediate layer 11 may be set to a value appropriate for performing the antireflection performance. The intermediate layer 11 can be formed by using the above materials by a wet film formation method, a vacuum film formation method, a plasma CVD method, an atomic layer deposition (ALD) method or the like.

The intermediate layer 11 is an optical single layer having a refractive index in the range shown in the expression (1) or the expression (2). The intermediate layer 11 may be a single layer from the optical view point, also a single layer from the physical viewpoint or an equivalent stack having a multiple-layer structure that satisfies the relation in the expression (1) at the reference wavelength. The reference wavelength may be any wavelength defined over the range of 400 nm to 700 nm.

As the equivalent stack, a three-layer equivalent stack provided by Herpin matrix, a composite film where a plurality of ultrathin films having a film thickness of 1 angstrom to 200 angstrom are stacked on the surface of the base material 20, a composite film formed by a multi-source film formation method or the like can be listed. For example, the three-layer equivalent stack may be an equivalent symmetrical three-layer film satisfying a refractive index and a phase angle provided by the Herpin matrix using two types of stable deposition materials. The composite film where the plurality of ultrathin films are stacked may be produced by using an optical sputtering system RAS manufactured by Shincron Co., Ltd. When the composite film is formed by the multi-source film formation method, the composite film can be formed by preparing two or more evaporation sources made of different materials and film formation is performed at the same time by using, for example, the plurality of evaporation sources by using a multi-source film formation sputtering system manufactured by Shinko Seiki Co., Ltd. or the like.

In the antireflection film 10 according to the present invention, the optical film thickness of the intermediate layer 11 is preferably 100 nm to 180 nm inclusive. When the optical film thickness of the intermediate layer 11 is out of the range, it is not preferable since the required antireflection effect cannot be achieved in any case even when the refractive index of the intermediate layer 11 satisfies relation of the expression (1) or the expression (2). When the intermediate layer 11 is replaced with the equivalent stack described above, the optical film thickness of the whole equivalent stack is required to be between 100 nm and 180 nm inclusive.

(4) Functional Layer 16

In the present invention, the functional layer 16 whose refractive index n(3) is between 1.30 and 2.35 inclusive and whose film thickness is between 1 nm and 30 nm inclusive may also be provided on the surface of the low refractive index layer 12 as shown in FIG. 1. The antireflection film 10 according to the present invention is mainly composed of the optical two-layer structure composed of the intermediate layer 11 provided on the base material 20 and the low refractive index layer 12 provided on the surface of the intermediate layer 11 for achieving an antireflection function. The functional layer 16 is a transparent ultrathin film which does not optically affect the antireflection effect achieved by the optical two-layer structure composed of the intermediate layer 11 and the low refractive index layer 12, and is a layer having a function to improve the hardness, the scratch resistance, the heat resistance, the weather resistance, the solvent resistance, the water repellency, the oil repellency, the anti-fog property, the wettability, the anti-fouling resistance, the conductivity or the like on the surface of the antireflection film 10.

When the refractive index n(3) of the functional layer 16 is between 1.30 and 2.35 inclusive and the film thickness thereof is between 1 nm and 30 nm inclusive, the optical influence on the antireflection effect of the optical two-layer structure can be neglected. When the refractive index exceeds the above range, the antireflection characteristics of the antireflection film 10 may be optically affected. When the film thickness is less than 1 nm, it is not preferable since the desired functions cannot be performed even when the functional layer 16 is provided. When the film thickness exceeds 30 nm, it is also not preferable since the antireflection characteristics of the antireflection film 10 may be optically affected even if the refractive index is within the above range. From the above viewpoints, the more preferable film thickness of the functional layer 16 is between 5 nm and 10 nm inclusive.

A transparent material having a refractive index of 1.30 to 2.35 inclusive may be used as the material constituting the functional layer 16. As long as the material has a refractive index in the above range and is transparent, an appropriate material may be selected according to the function to be provided on the surface of the antireflection film 10. For example, the transparent inorganic materials having a refractive index in the above range, $SiO_xN_y$, $SiO_2$, $SiO_x$, $Al_2O_3$, a mixture of $ZrO_2$ and $TiO_2$, a mixture of $La_2O_3$ and $TiO_2$, $SnO_2$, $ZrO_2$, a mixture of $La_2O_3$ and $Al_2O_3$, $Pr_2O_5$, ITO (indium tin oxide), AZO (aluminum zinc oxide) or the like can be listed. In addition, DLC (diamond-like carbon), HMDSO (hexamethyldisiloxane), Epoxy-based resin, Acrylic-based resin (particularly PMMA resin, fluorine-contained resin or the like can be used. Further, various hard coating agents containing these materials may also be used. As a method for formation of the functional layer 16, an appropriate film formation method may be employed according to the material and the film thickness.

When the functional layer 16 is provided on the surface of the low refractive index layer 12, the whole optical film thickness as the sum of the optical film thickness of the low refractive index layer 12 and the optical film thickness of the functional layer 16 is required to be between 100 nm and 180 nm inclusive. When the whole optical film thickness is out of the above range, the antireflection effect of the antireflection film 10 may be made poor, so it is not preferable.

(5) Base Material 20

In the antireflection film 10 according to the present invention, the base material for an optical device may be used as the base material 20 on which the antireflection film 10 is provided. The base material for an optical device may be made of any material such as glass or plastics. For example, various base materials for an optical device such as a lens, a prism (a color separation prism or a color composite prism), a polarized beam splitter (PBS), a cut filter (for infrared rays or ultraviolet rays) or the like may be used. Here, when the resin or the glass having a high thermal expansion coefficient are used as a base material 20, the heat treatment carried out in a process for producing the antireflection film 10 is preferably carried out at a heat treatment temperature of 90° C. to 200° C. inclusive to prevent the base material 20 from being deformed due to thermal expansion or the like.

(6) Reflectance

The antireflection film 10 having the above structure can achieve a reflectance of 1% or less against a light beam having a wavelength of 400 nm to 680 nm inclusive at an incident angle of 0° to 50° inclusive. More specifically, the reflectance against a light beam having a wavelength of 400 nm to 800 nm inclusive at an incident angle of 0° is 0.5% or less, and the reflectance against a light beam having a wavelength of 400 nm to 680 nm inclusive at an incident angle of 0° to 45° inclusive is 0.7% or less. Further specifically, the reflectance against a light beam having a wavelength of 400 nm to 700 nm inclusive at an incident angle of 0° is 0.3% or less, and the reflectance against a light beam having a wavelength of 400 nm to 680 nm inclusive at an incident angle of 0° to 45° inclusive is 0.5% or less.

2. Optical Device

The optical device according to the present invention is characterized in provided with the antireflection film 10 described above. With regard to the optical devices, an imaging optical device and a projecting optical device or the like can be listed. Specifically, a lens, a prism (a color separation prism or a color composition prism), a polarization beam splitter (PBS), a cut filter (for infrared rays or ultraviolet rays) or the like can be listed. As the lens, various lenses such as an interchangeable lens for a single-lens reflex camera, a lens mounted on a digital camera (DSC), a digital camera lens mounted on a mobile phone or the like can be listed.

With the embodiments described above, the antireflection film 10 according to the present invention is excellent in antireflection characteristics against a light beam having a wide wavelength range at a wide range of an incident angle as described above.

In addition, main structure of the antireflection film 10 according to the present invention is composed of the optical two-layer structure composed of the intermediate layer 11 provided on the base material 20 and the low refractive index layer 12 provided on the surface of the intermediate layer 11, and the refractive index n(2) of the intermediate layer 11 can be optically designed easily according to the expression (1) or the expression (2) by using the refractive index n(1) of the low refractive index layer 12 and the refractive index n(sub) of the base material 20.

Further in the antireflection film 10 according to the present invention, the intermediate layer 11 may be the equivalent stack having the multi-layer structure that satisfies the relation in the expression (1) at the reference wavelength (for example, any wavelength defined over the range of 400 nm to 700 nm). Therefore, the intermediate layer 11 having the optimum refractive index n(2) can be formed by using an appropriate material regarding the refractive index n(sub) of the base material 20 and the refractive index n(1) of the low refractive index layer 12. As a result, it is made easy to produce the antireflection film 10 according to the present invention having excellent reflection characteristics against the light beam having a wide wavelength range at a wide range of an incident angle according to the optical design.

The present embodiment described above is just one aspect of the antireflection film 10 and the optical device according to the present invention, and it goes without saying that the present embodiment may be appropriately arranged without departing from the scope of the present invention. Although the present invention will be more specifically demonstrated with the examples below, but the present invention should not be limited to the examples below.

EXAMPLE 1

In the Example 1, a lens made of N-LAK14 glass manufactured by SCHOTT AG corp. was used as a base material 20. The antireflection film 10 having a structure shown in Table 1 was provided on the surface of the base material 20. Specifically, the intermediate layer 11 made of $SiO_2$ was provided on the surface of the base material 20 with a thickness of 90 nm by vacuum vapor deposition using BMC1300 manufactured by Shincron Co., Ltd. Note that the intermediate layer 11 was not a layer formed by using the hollow silica 13, but was a vapor deposited layer of $SiO_2$ (in the following, the term $SiO_2$ means $SiO_2$ without a hollow structure.).

Next, a coating solution prepared by dissolving an acrylic resin as the binder component in a solvent and suspending the hollow silica 13 was used to form the low refractive index layer 12 on the surface of the intermediate layer 11 by spin coating using MS-A150 manufactured by Mikasa Co, Ltd. Then, the low refractive index layer 12 was heated at 90° C. for 120 seconds in a clean oven (as pre-baking), and then heated for 1 hour at 150° C. (as post-baking) for volatilization of the solvent and curing was carried out to obtain the low refractive index layer 12 having a thickness of 121 nm composed of the hollow silica 13 bound by the acrylic resin as the binder 14.

Note that in the present Example 1, the coating solution used was prepared by dissolving acrylic resin in a solvent containing propylene glycol monomethyl ether and propylene glycol as a main component and suspending hollow silica particles having a particle size of about 60 nm. In addition, a desired film thickness can be adjusted by adjusting the concentration of the solution by a solvent. Further, the refractive index of the low refractive index layer can be appropriately adjusted to a desired refractive index in the range of 1.15 to 1.24 by adjusting the concentration of the acrylic resin component in the coating solution also.

Table 1 shows the layer structure of the antireflection film 10 prepared in the present Example 1 and the refractive indexes of the respective layers. Based on the expression (1), and refractive indexes n(1) of the low refractive index layer 12 and n(sub) of the base material 20, preferable refractive index n(2) of the intermediate layer 11 is in a range of $1.40 \leq n(2) \leq 1.49$. As shown in Table 1, the refractive index n(2) of the intermediate layer 11 was 1.46 in the present example 1.

TABLE 1

| | Material | Refractive index (n) | Film thickness (d) (nm) | Optical film thickness (nd) (nm) |
|---|---|---|---|---|
| Base material | N-LAK14 | 1.69 | — | — |
| Intermediate layer | $SiO_2$ | 1.46 | 90 | 132 |
| Surface layer | Hollow silica | 1.16 | 121 | 140 |
| Functional layer | Not provided | — | — | — |

EXAMPLE 2

In the Example 2, the same base material 20 as that in the Example 1 was used, and the antireflection film 10 was provided on the base material 20 in a similar manner to Example 1 except that the intermediate layer 11 was replaced with a PMMA resin layer having a physical film thickness of 89 nm and an optical film thickness of 134 nm. As the intermediate layer 11, a coating solution prepared by dissolving acrylic resin in propylene glycol monomethyl acetate as a solvent was used to form the PMMA resin film on the base material 20 by spin coating. Table 2 shows the layer structure of the antireflection film 10 prepared in the present Example 2 and the refractive indexes of the respective layers. Based on the expression (1), and refractive indexes n(1) of the low refractive index layer 12 and n(sub) of the base material 20, preferable refractive index n(2) of the intermediate layer 11 is in a range of $1.45 \leq n(2) \leq 1.54$. As shown in Table 2, the refractive index n(2) of the intermediate layer 11 was 1.50 in the present example 2.

TABLE 2

| | Material | Refractive index (n) | Film thickness (d) (nm) | Optical film thickness (nd) (nm) |
|---|---|---|---|---|
| Base material | N-LAK14 | 1.69 | — | — |
| Intermediate layer | PMMA resin | 1.50 | 89 | 134 |
| Surface layer | Hollow silica | 1.20 | 115 | 138 |
| Functional layer | Not provided | — | — | — |

EXAMPLE 3

In the Example 3, the same base material 20 as that in the Example 1 was used, and the antireflection film 10 was provided on the base material 20 in a similar manner to Example 1 except that a three-layer equivalent stack was employed as the intermediate layer 11. Table 3 shows the structure of the three-layer equivalent stack in the present example 3. The three-layer equivalent stack was formed such that each layer having a film thickness shown in Table 3 were provided by vacuum vapor deposition using BMC1300 manufactured by Shincron Co., Ltd. Based on the expression (1), and refractive indexes n(1) of the low refractive index layer 12 and n(sub) of the base material 20, preferable refractive index n(2) of the intermediate layer 11 is in a range of $1.45 \leq n(2) \leq 1.54$. The effective refractive index n(2) of the three-layer equivalent stack as the intermediate layer 11 shown in Table 3 was 1.50.

TABLE 3

|  | Material | Refractive index (n) | Film thickness (d) (nm) | Optical film thickness (nd) (nm) |
| --- | --- | --- | --- | --- |
| Base material | N-LAK14 | 1.69 | — | — |
| Intermediate layer (three-layer equivalent stack) | SiO$_2$ | 1.46 | 38 | 56 |
|  | Al$_2$O$_3$ | 1.63 | 13 | 21 |
|  | SiO$_2$ | 1.46 | 38 | 56 |
| Surface layer | Hollow silica | 1.20 | 112 | 134 |
| Functional layer | Not provided | — | — | — |

EXAMPLE 4

In the Example 4, the same base material 20 as that in the Example 1 was used, and the antireflection film 10 was provided on the base material 20 in a similar manner to Example 1 except that a three-layer equivalent stack was employed as the intermediate layer 11. Table 4 shows the structure of the three-layer equivalent stack in the present example 4. The physical film thickness of the whole three-layer equivalent stack was 89 nm and the optical film thickness thereof was 136 nm. Based on the expression (1), and refractive indexes n(1) of the low refractive index layer 12 and n(sub) of the base material 20, preferable refractive index n(2) of the intermediate layer 11 is in a range of $1.51 \leq n(2) \leq 1.60$. As shown in Table 4, the refractive index n(2) of the intermediate layer 11 was 1.53 in the present example 4.

TABLE 4

|  | Material | Refractive index (n) | Film thickness (d) (nm) | Optical film thickness (nd) (nm) |
| --- | --- | --- | --- | --- |
| Base material | N-LAK14 | 1.69 | — | — |
| Intermediate layer | PMMA resin | 1.53 | 89 | 136 |
| Surface layer | Hollow silica | 1.25 | 110 | 138 |
| Functional layer | Not provided | — | — | — |

EXAMPLE 5

In the Example 5, a lens made of synthetic quartz (SiO$_2$) was used as the base material 20. The antireflection film 10 having a structure shown in Table 5 was provided on the surface of the base material 20. Specifically, the intermediate layer 11 made of MgF$_2$ was provided on the surface of the base material 20 with a thickness of 90 nm by vacuum vapor deposition. The low refractive index layer 12 obtained by binding the hollow silica 13 by the acrylic resin was provided on the surface of the intermediate layer 11 with a thickness of 114 nm in a similar manner to Example 1. Table 5 shows the layer structure of the antireflection film 10 prepared in the present Example 5 and the refractive indexes of the respective layers. Based on the expression (1), and refractive indexes n(1) of the low refractive index layer 12 and n(sub) of the base material 20, preferable refractive index n(2) of the intermediate layer 11 is in a range of $1.36 \leq n(2) \leq 1.44$. As shown in Table 5, the refractive index n(2) of the intermediate layer 11 was 1.38 in the present example 5.

TABLE 5

|  | Material | Refractive index (n) | Film thickness (d) (nm) | Optical film thickness (nd) (nm) |
| --- | --- | --- | --- | --- |
| Base material | Synthetic quartz | 1.48 | — | — |
| Intermediate layer | MgF$_2$ | 1.38 | 100 | 138 |
| Surface layer | Hollow silica | 1.20 | 114 | 137 |
| Functional layer | Not provided | — | — | — |

EXAMPLE 6

In the Example 6, the same base material 20 as that in the Example 5 was used, and the antireflection film 10 was provided on the base material 20 in a similar manner to Example 1 except that the intermediate layer 11 was replaced with a PMMA resin layer having a physical film thickness of 89 nm and an optical film thickness of 134 nm and where hollow silica was mixed. As the intermediate layer 11, a coating solution in which acrylic resin (TMR-0006) manufactured by Tokyo Ohka Kogyo Co., Ltd. and a hollow silica solution were mixed was used and the PMMA resin film in which the hollow silica was mixed was provided on the base material 20 by spin coating. By making the concentration of the acrylic resin component in the coating solution higher than that of the low refractive index layer 12, the refractive index of the layer formed by using the coating solution can be freely adjusted to a refractive index (up to 1.54) higher than 1.25. After the low refractive index layer 12 was provided on the surface of the intermediate layer 11 in a similar manner to Example 5, a water-repellent layer made of perfluoroalkyl was provided as the functional layer 16 on the surface of the low refractive index layer 12 with a thickness of 1 nm by vacuum vapor deposition using BMC1300 manufactured by Shincron Co., Ltd. Here, the sum of the optical film thickness of the low refractive index layer 12 and the optical film thickness of the functional layer was 131 nm. Table 6 shows the layer structure of the antireflection film 10 produced in present Example 6 and the refractive indexes of the respective layers. Based on the expression (1), and refractive indexes n(1) of the low refractive index layer 12 and n(sub) of the base material 20, preferable refractive index n(2) of the intermediate layer 11 is in a range of $1.31 \leq n(2) \leq 1.39$. As shown in Table 6, the refractive index n(2) of the intermediate layer 11 was 1.36 in the present example 6.

TABLE 6

|  | Material | Refractive index (n) | Film thickness (d) (nm) | Optical film thickness (nd) (nm) |
| --- | --- | --- | --- | --- |
| Base material | Synthetic quartz | 1.48 | — | — |
| Intermediate layer | PMMA resin + Hollow silica | 1.36 | 38 | 52 |
| Surface layer | Hollow silica | 1.16 | 112 | 130 |
| Functional layer | Perfluoro-alkyl | 1.38 | 1 | 1 |

EXAMPLE 7

In the Example 7, the same base material 20 as that in the Example 5 was used, and the antireflection film 10 having the same layer structure as that in the Example 5 was provided. Then, a protective layer made of $SiO_2$ was provided as the functional layer 16 on the surface of the low refractive index layer 12 with a thickness of 4.5 nm by vacuum vapor deposition using BMC1300 manufactured by Shincron Co., Ltd. Table 7 shows the layer structure of the antireflection film 10 prepared in the present Example 7 and the refractive indexes of the respective layers. The sum of the optical film thickness of the low refractive index layer 12 and the optical film thickness of the protective layer was 129 nm. Based on the expression (1), and refractive indexes n(1) of the low refractive index layer 12 and n(sub) of the base material 20, preferable refractive index n(2) of the intermediate layer 11 is in a range of 1.36≤n(2)≤1.44, which is the same as Example 5. The actual refractive index n(2) of the intermediate layer 11 was 1.38, which is also the same as Example 5.

TABLE 7

| | Material | Refractive index (n) | Film thickness (d) (nm) | Optical film thickness (nd) (nm) |
|---|---|---|---|---|
| Base material | Synthetic quartz | 1.48 | — | — |
| Intermediate layer | $MgF_2$ | 1.38 | 101 | 140 |
| Surface layer | Hollow silica | 1.20 | 102 | 122 |
| Functional layer | $SiO_2$ | 1.48 | 4.5 | 7 |

EXAMPLE 8

In the Example 8, the base material 20 having a higher refractive index than those of the base materials 20 used in the Examples 1 to 7 was used. Specifically, a lens made of E-FDS1 glass manufactured by HOYA Corporation and having a refractive index n(sub) of 1.92 was used. The antireflection film 10 having a structure shown in Table 8 was provided on the surface of the base material 20. Specifically, a three-layer equivalent stack composed of an $SiO_2$ layer, an $Nb_2O_5$ layer, and an $SiO_2$ layer was formed as the intermediate layer 11 on the surface of the base material 20 by radical assisted sputtering by using RAS1100 manufactured by Shincron Co., Ltd. Then, the low refractive index layer 12 obtained by binding the hollow silica 13 by the acrylic resin as the binder 14 was provided on the surface of the intermediate layer 11 composed of the three-layer equivalent stack in a similar manner to Example 1. Table 8 shows the layer structure of the antireflection film 10 prepared in the present Example 8 and the refractive indexes of the respective layers. Based on the expression (1), and refractive indexes n(1) of the low refractive index layer 12 and n(sub) of the base material 20, preferable refractive index n(2) of the intermediate layer 11 composed of the three-layer equivalent stack is in a range of 1.55≤n(2)≤1.64. The effective refractive index n(2) of the three-layer equivalent stack as the intermediate layer 11 as shown in Table 8 was 1.57. The physical film thickness of the whole three-layer equivalent stack was 77 nm, and the optical film thickness thereof was 120 nm.

TABLE 8

| | Material | Refractive index (n) | Film thickness (d) (nm) | Optical film thickness (nd) (nm) |
|---|---|---|---|---|
| Base material | E-FDS1 | 1.92 | — | — |
| Intermediate layer (three-layer equivalent stack) | $SiO_2$ | 1.48 | 36 | 54 |
| | $Nb_2O_2$ | 2.35 | 5 | 12 |
| | $SiO_2$ | 1.48 | 36 | 54 |
| Surface layer | Hollow silica | 1.20 | 115 | 138 |
| Functional layer | Not provided | — | — | — |

EXAMPLE 9

In the Example 9, the base material 20 having a higher refractive index than those of the base materials 20 used in the Examples 1 to 7 was used in a similar manner to Example 8. Specifically, a lens made of E-FDS1 glass manufactured by HOYA Corporation and having a refractive index n(sub) of 1.92 was used. Then, the antireflection film 10 having a multi-layer structure shown in Table 9 was provided on the surface of the base material 20. Specifically, as the intermediate layer 11, an ultrathin $SiO_2$ layer was provided followed by providing an ultrathin $Nb_2O_5$ layer, and the same procedure was repeated 10 times to form an equivalent stack as a multi-layer composite film where the $SiO_2$ layers and the $Nb_2O_5$ layers were alternately stacked on the surface of the base material 20 by the same RAS method as the method of forming the three-layer equivalent stack in the Example 8. Next, the low refractive index layer 12 obtained by binding the hollow silica 13 by the acrylic resin as the binder 14 was provided on the surface of the intermediate layer 11 composed of the multi-layer composite film in a similar manner to Example 1. Table 9 shows the layer structure of the antireflection film 10 prepared in the present Example 9 and the refractive indexes of the respective layers. Based on the expression (1), and refractive indexes n(1) of the low refractive index layer 12 and n(sub) of the base material 20, preferable refractive index n(2) of the intermediate layer 11 composed of the multi-layer equivalent stack is in a range of 1.55≤n(2)≤1.64. The effective refractive index n(2) of the composite equivalent stack as the intermediate layer 11 shown in Table 9 was 1.60. The physical film thickness of the whole multi-layer equivalent stack was 80 nm, and the optical film thickness thereof was 125 nm.

TABLE 9

| | Material | Refractive index (n) | Film thickness (d) (nm) | Optical film thickness (nd) (nm) |
|---|---|---|---|---|
| Base material | N-SK5 | 1.92 | — | — |
| Intermediate layer (multi-layer equivalent stack) | $SiO_2$ (×10 layers) | 1.48 | 74 (7.4 × 10) | 110 (11 × 10) |
| | $Nb_2O_5$ (×10 layers) | 2.35 | 6 (0.6 × 10) | 15 (1.5 × 10) |
| Surface layer | Hollow silica | 1.20 | 112 | 134 |
| Functional layer | Not provided | — | — | — |

EXAMPLE 10

In the Example 10, the same base material 20 as that in the Example 3 was used, and the antireflection film 10 was provided on the base material 20 in a similar manner to Example 1 except that the refractive index of the three-layer equivalent stack as the intermediate layer 11 was changed. Table 10 shows the structure of the three-layer equivalent stack in the present example 10. To change the refractive index of the three-layer equivalent stack, each layer was formed to have a film thickness shown in Table 10. Based on the expression (1), and refractive indexes n(1) of the low refractive index layer 12 and n(sub) of the base material 20, preferable refractive index n(2) of the intermediate layer 11 is in a range of 1.45≤n(2)≤1.54. As shown in Table 10, the refractive index n(2) of the intermediate layer 11 was 1.52 in the present example.

TABLE 10

| | Material | Refractive index (n) | Film thickness (d) (nm) | Optical film thickness (nd) (nm) |
|---|---|---|---|---|
| Base material | N-LAK14 | 1.69 | — | — |
| Intermediate layer (three-layer equivalent stack) | SiO$_2$ | 1.46 | 35 | 51 |
| | Al$_2$O$_3$ | 1.63 | 19 | 31 |
| | SiO$_2$ | 1.46 | 35 | 51 |
| Surface layer | Hollow silica | 1.20 | 112 | 134 |
| Functional layer | Not provided | — | — | — |

COMPARATIVE EXAMPLES

Comparative Example 1

Next, the antireflection film 10 of Comparative Example 1 will be described. In the Comparative Example 1, the same base material as that in the Example 1 was used. An antireflection film is provided by stacking three layers: an Al$_2$O$_3$ layer, a ZrO$_2$ layer, and an MgF$_2$ on the surface of the base material 20. The respective layers were formed to predetermined thicknesses by vacuum vapor deposition using BMC1300 manufactured by Shincron Co., Ltd. Table 11 shows the layer structure of the antireflection film prepared in the present Comparative Example 1 and the refractive indexes of the respective layers.

TABLE 11

| | Material | Refractive index (n) | Film thickness (d) (nm) | Optical film thickness (nd) (nm) |
|---|---|---|---|---|
| Base material | N-LAK14 | 1.69 | — | — |
| First layer | Al$_2$O$_3$ | 1.63 | 156 | 255 |
| Second layer | ZrO$_2$ | 2.00 | 128 | 255 |
| Third layer | MgF$_2$ | 1.16 | 92 | 107 |

Comparative Example 2

Next, an antireflection film of Comparative Example 2 will be described. In the present Comparative Example 2, the same base material as that in the Example 2 was used. An antireflection film obtained by laminating an Al$_2$O$_3$ layer as an intermediate layer and a low refractive index layer containing hollow silica was provided on the surface of the base material. In the formation of the intermediate layer, film was formed to be a predetermined thickness by vacuum vapor deposition using BMC1300 manufactured by Shincron Co., Ltd. Table 12 shows the layer structure of the antireflection film prepared in the present Comparative Example 2 and the refractive indexes of the respective layers. In the present Comparative Example 2, based on the expression (1), and the refractive indexes n(1) and n(sub) of the low refractive index layer 12 and the base material 20, the refractive index n(2) of the intermediate layer 11 is preferably in a range of 1.45≤n(2)≤1.54. However, in the present Comparative Example 2, the intermediate layer was made to be a layer whose refractive index n(2) exceeded the maximum value (n(2)=1.63) in the range of the expression (1).

TABLE 12

| | Material | Refractive index (n) | Film thickness (d) (nm) | Optical film thickness (nd) (nm) |
|---|---|---|---|---|
| Base material | N-LAK14 | 1.69 | — | — |
| Intermediate layer | Al$_2$O$_3$ | 1.63 | 80 | 130 |
| Surface layer | Hollow silica | 1.20 | 115 | 138 |
| Functional layer | Not provided | — | — | — |

Comparative Example 3

Next, an antireflection film of Comparative Example 3 will be described. In the present Comparative Example 3, the same base material as that in the Example 2 was used. An antireflection film was provided by stacking an MgF$_2$ layer as an intermediate layer and a low refractive index layer containing hollow silica on the surface of the base material. The intermediate layer was formed to a predetermined thickness by vacuum vapor deposition using BMC1300 manufactured by Shincron Co., Ltd. Table 13 shows the layer structure of the antireflection film prepared in the present Comparative Example 3 and the refractive indexes of the respective layers. In the Comparative Example 3, based on the expression (1), and the refractive indexes n(1) and n(sub) of the low refractive index layer 12 and the base material 20, the refractive index n(2) of the intermediate layer 11 is preferably in a range of 1.45≤n(2)≤1.54. However, in the present Comparative Example 3, the intermediate layer was made to be a layer whose refractive index n(2) was lower than the minimum value (n(2)=1.38) in the range of the expression (1).

TABLE 13

| | Material | Refractive index (n) | Film thickness (d) (nm) | Optical film thickness (nd) (nm) |
|---|---|---|---|---|
| Base material | N-LAK14 | 1.69 | — | — |
| Intermediate layer | MgF$_2$ | 1.38 | 94 | 130 |
| Surface layer | Hollow silica | 1.20 | 115 | 138 |
| Functional layer | Not provided | — | — | — |

Evaluation

1. Reflectance

Next, the reflection characteristics of the respective antireflection films 10 prepared in the Examples 1 to 10 described above and the antireflection films in the Comparative Examples 1 to 3 were evaluated. The reflectance was measured by using a spectrophotometer U4000 manufactured by Hitachi High-Technologies Corp. The incident angle of a light beam incident to the antireflection film was set to 0°, 30°, 45°, 50°, and 60°, and the reflectance was measured over the wavelength range of the incident light of 400 nm to 800 nm at the respective incident angles. The measurement results for the reflectances of the antireflection films 10 prepared in the Examples 1 to 10 are shown in FIGS. 4 to 14. The maximum values of the reflectances in each wavelength ranges of the incident light of 400 to 680 nm, 400 to 700 nm, and 400 to 850 nm are shown in Table 14. In the antireflection films 10 prepared in the Examples 1 to 9, the reflectance against the light beam having the wavelength range of 400 to 800 nm at the incident angle of 0° were all 0.5% or less. The antireflection films 10 in the Examples 1, 2, and 6 according to the present invention achieved a reflectance of 0.3% or less against the light beam having the wavelength range of 400 to 700 nm at the incident angle of 0°. Moreover, the antireflection films 10 prepared in the Examples 1 to 10 had a reflectance of 0.7% or less against the light beam having the wavelength range of 400 to 700 nm at the incident angles of 0° to 45°. Furthermore, the reflectances against the light beam having the wavelength range of 400 to 680 nm at the incident angles of 0° to 50° were 1% or less.

Figure 6:
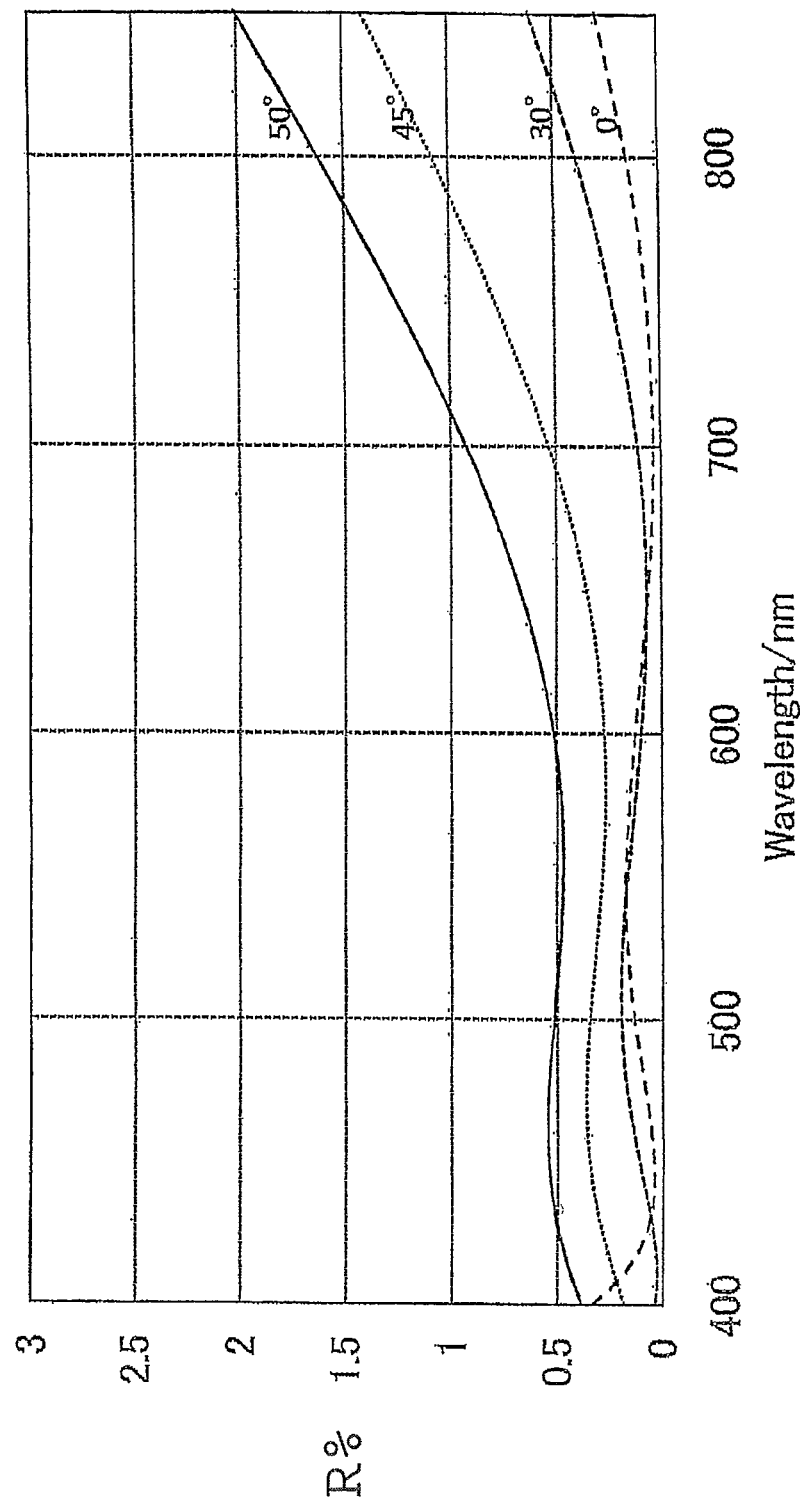
FIG. 6 is a graph showing the reflection characteristics of an antireflection film prepared in the Example 3.
Figure 7:
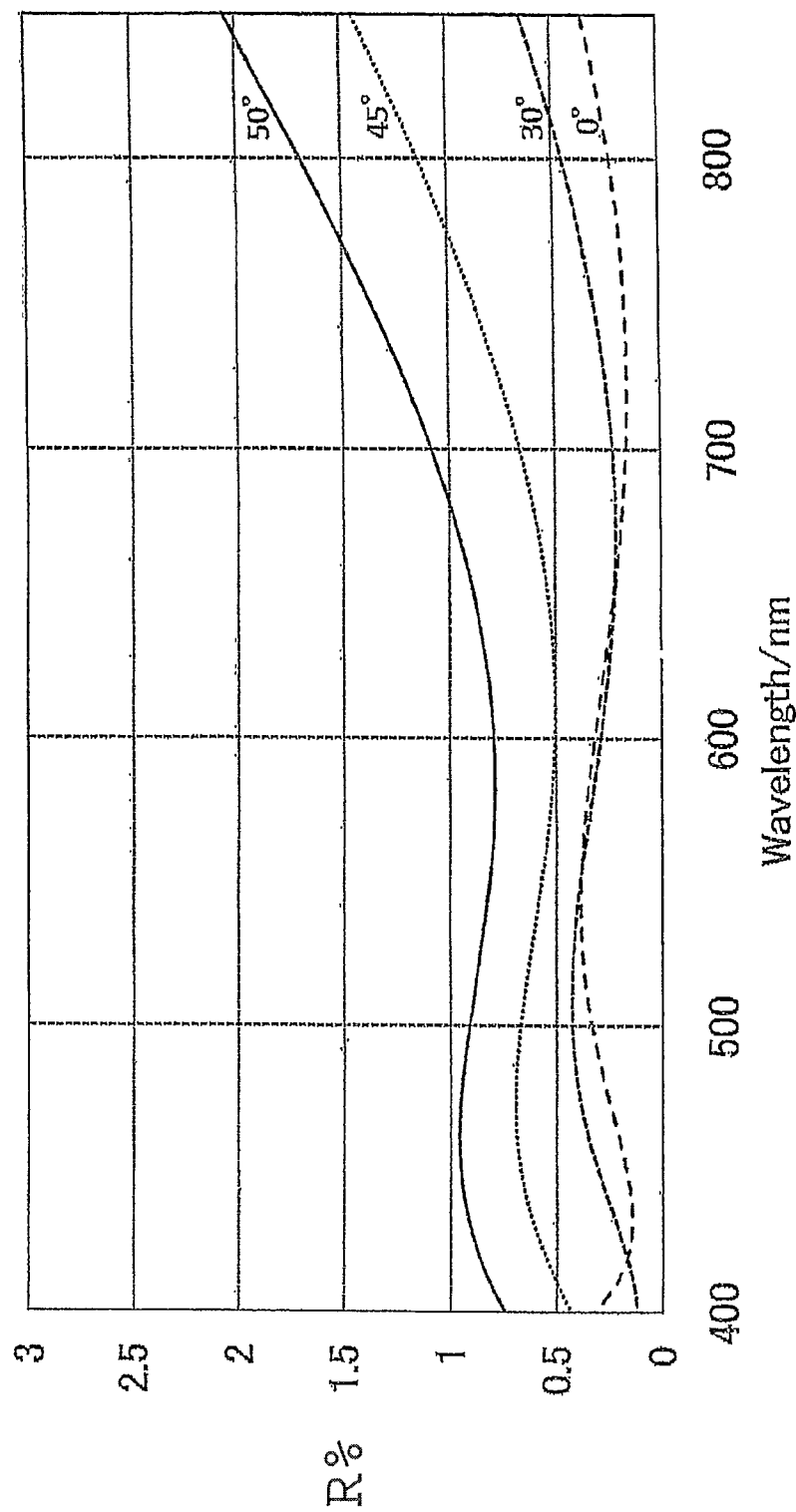
FIG. 7 is a graph showing the reflection characteristics of an antireflection film prepared in the Example 4.
Figure 8:
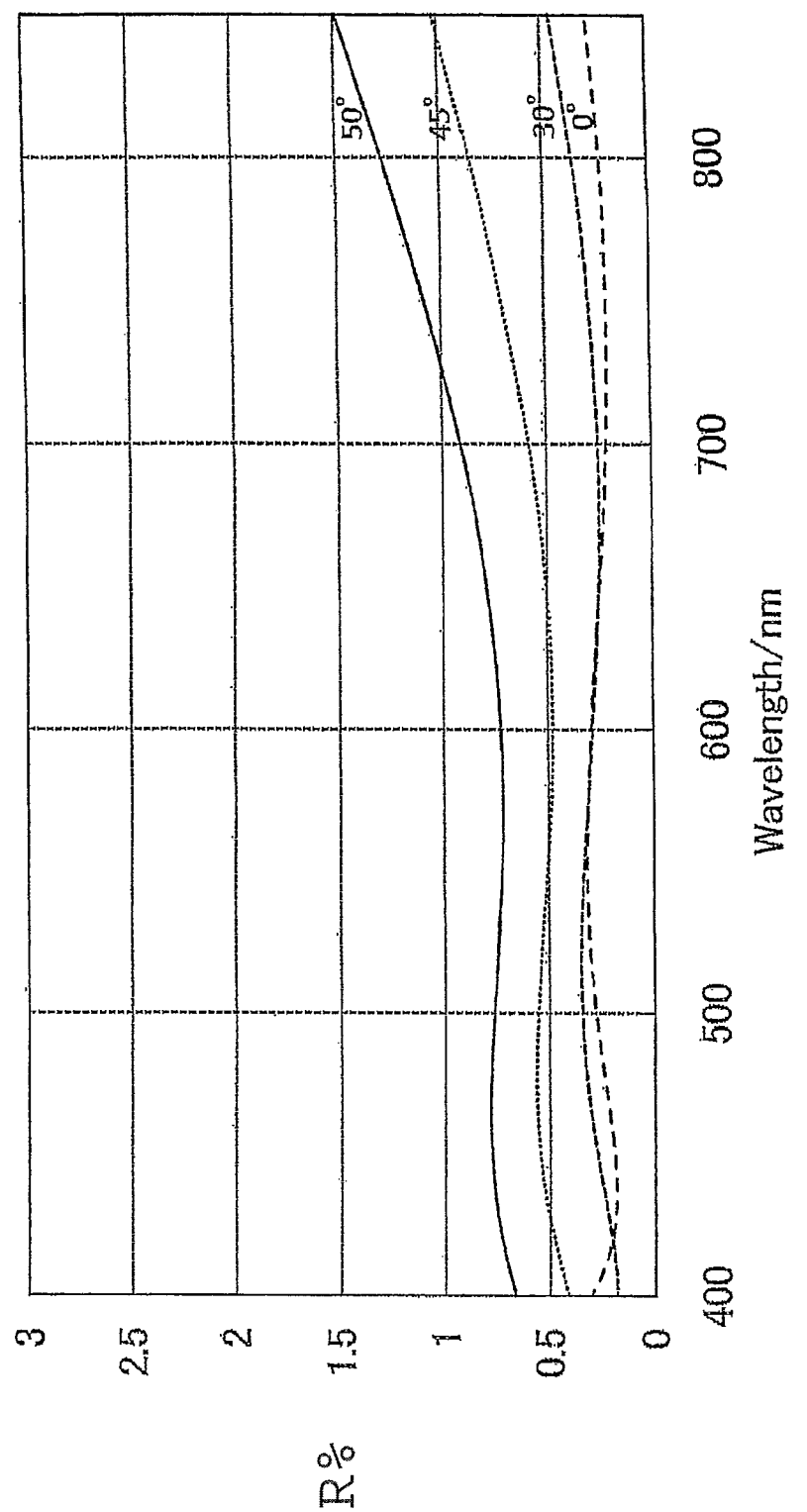
FIG. 8 is a graph showing the reflection characteristics of an antireflection film prepared in the Example 5.
Figure 9:
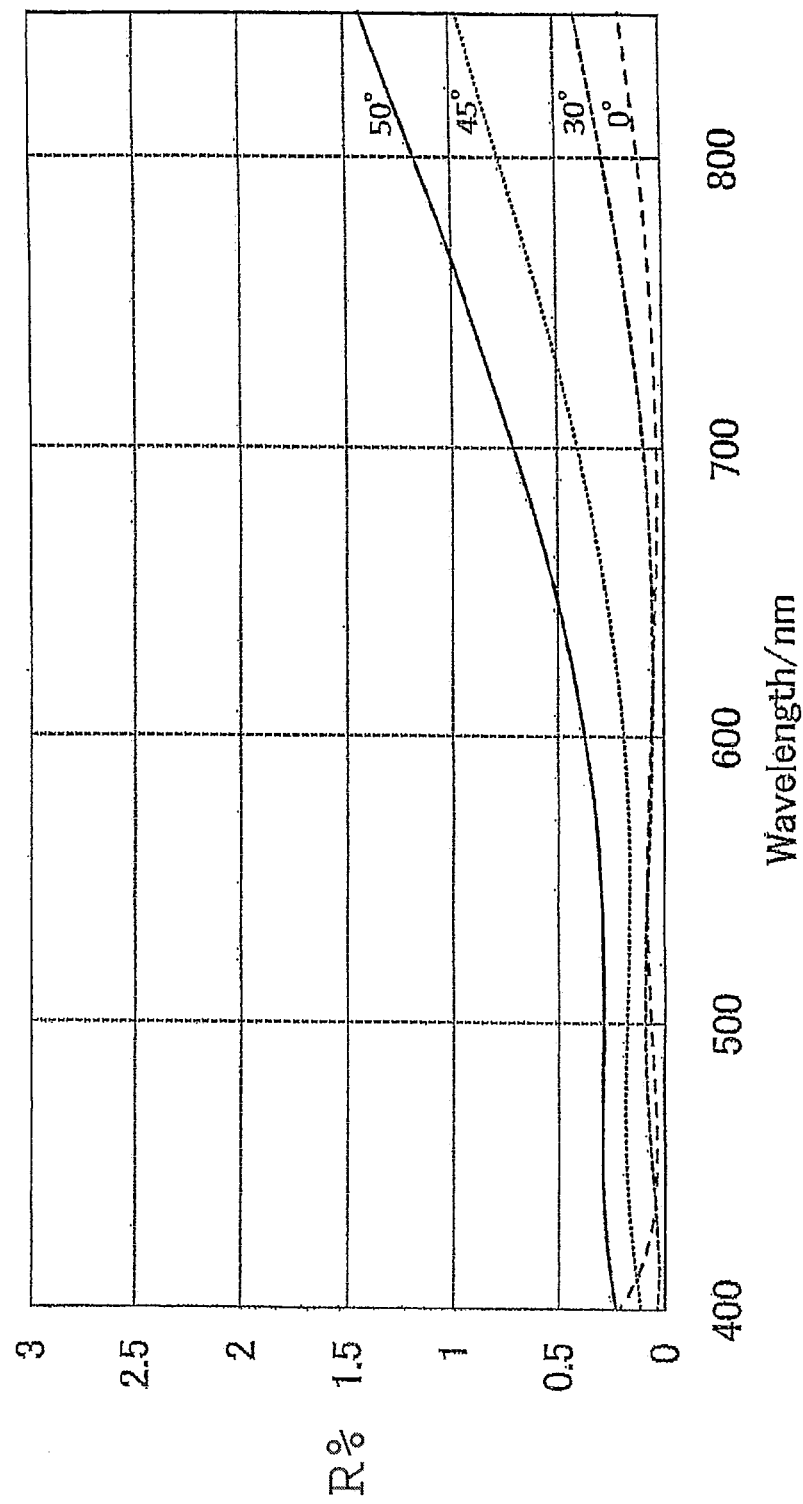
FIG. 9 is a graph showing the reflection characteristics of an antireflection film prepared in the Example 6.
Figure 10:
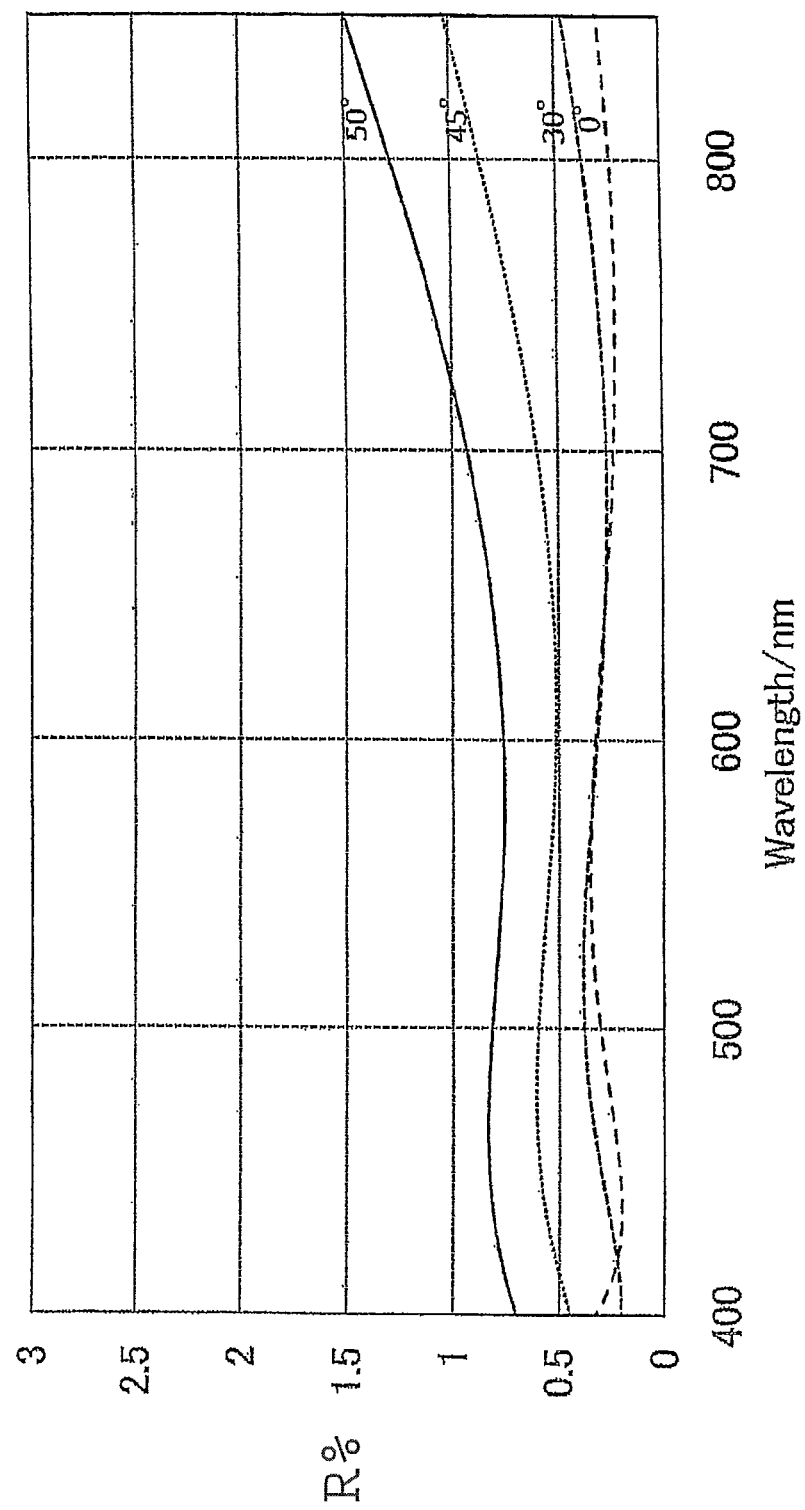
FIG. 10 is a graph showing the reflection characteristics of an antireflection film prepared in the Example 7.
Figure 11:
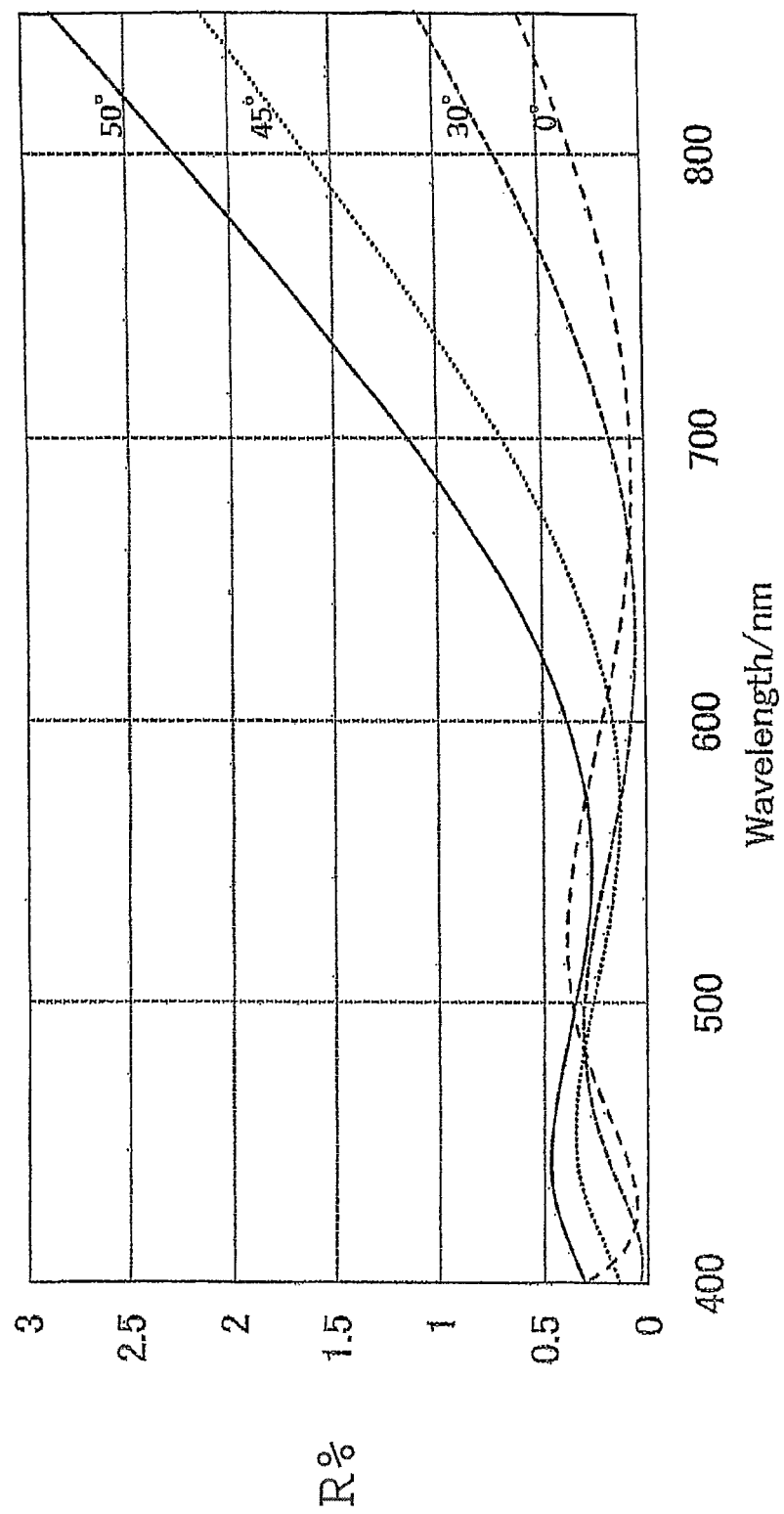
FIG. 11 is a graph showing the reflection characteristics of an antireflection film prepared in the Example 8.
Figure 12:
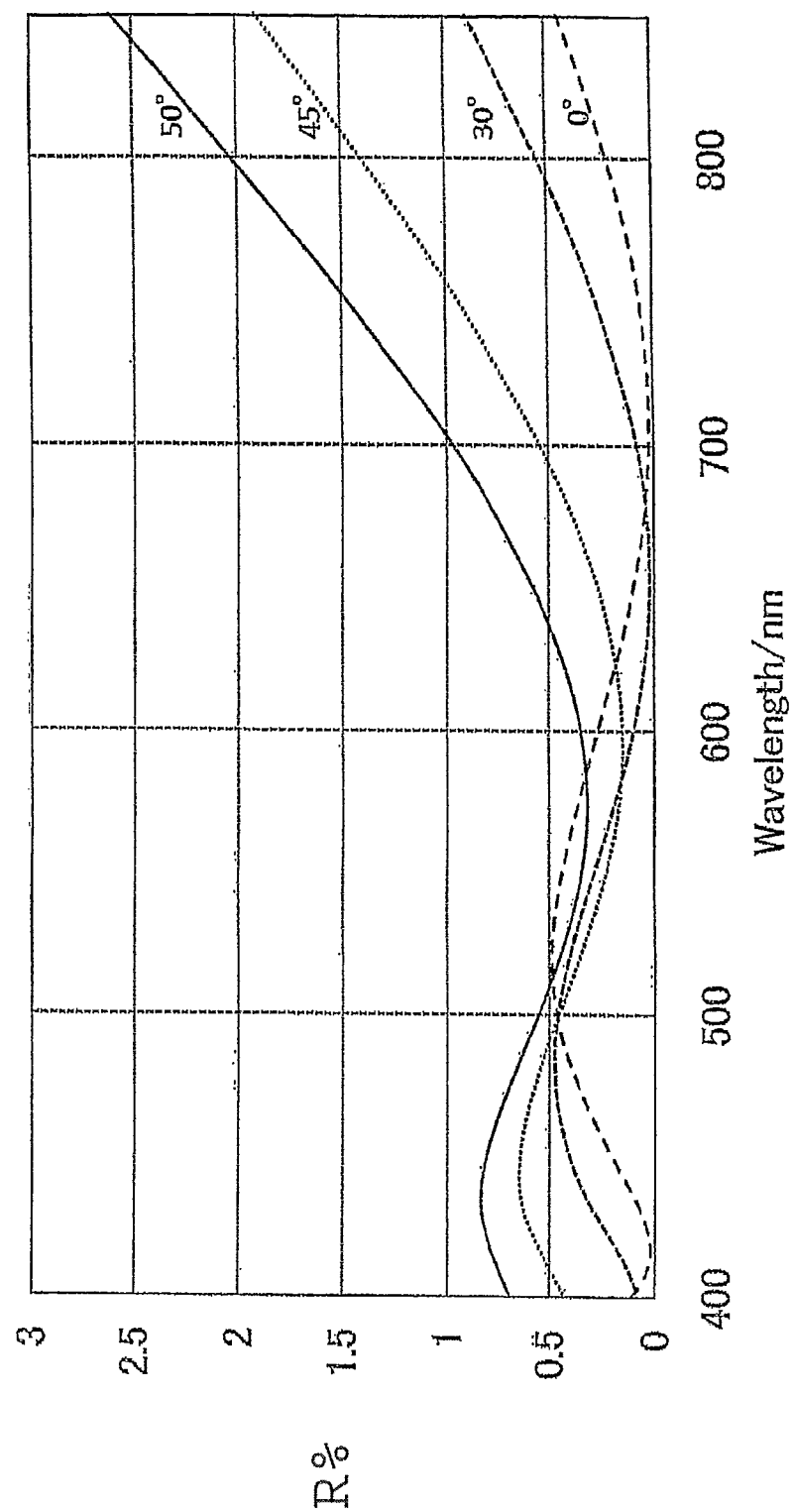
FIG. 12 is a graph showing the reflection characteristics of an antireflection film prepared in the Example 9.
Figure 13:
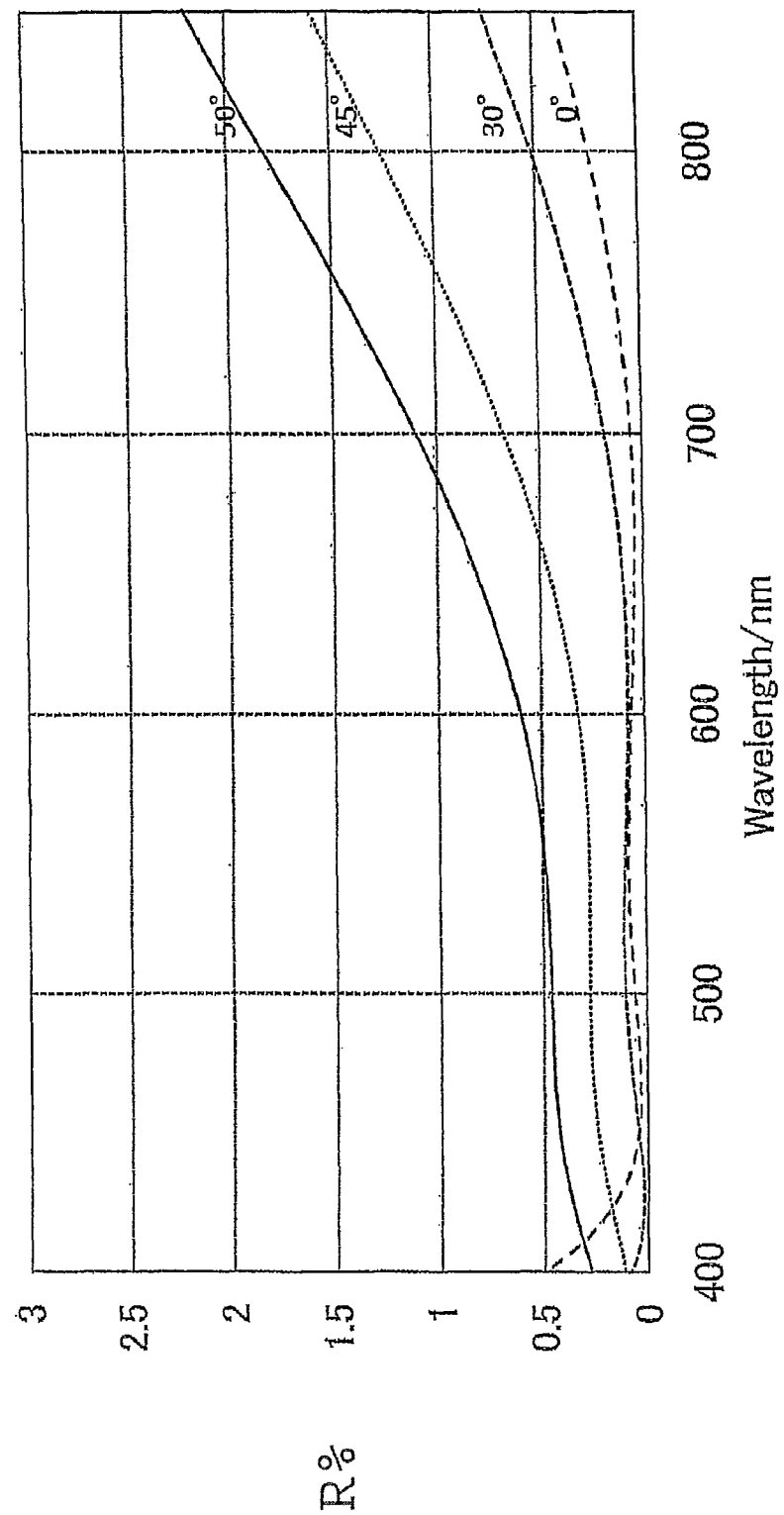
FIG. 13 is a graph showing the reflection characteristics of an antireflection film prepared in the Example 10.
Figure 14:
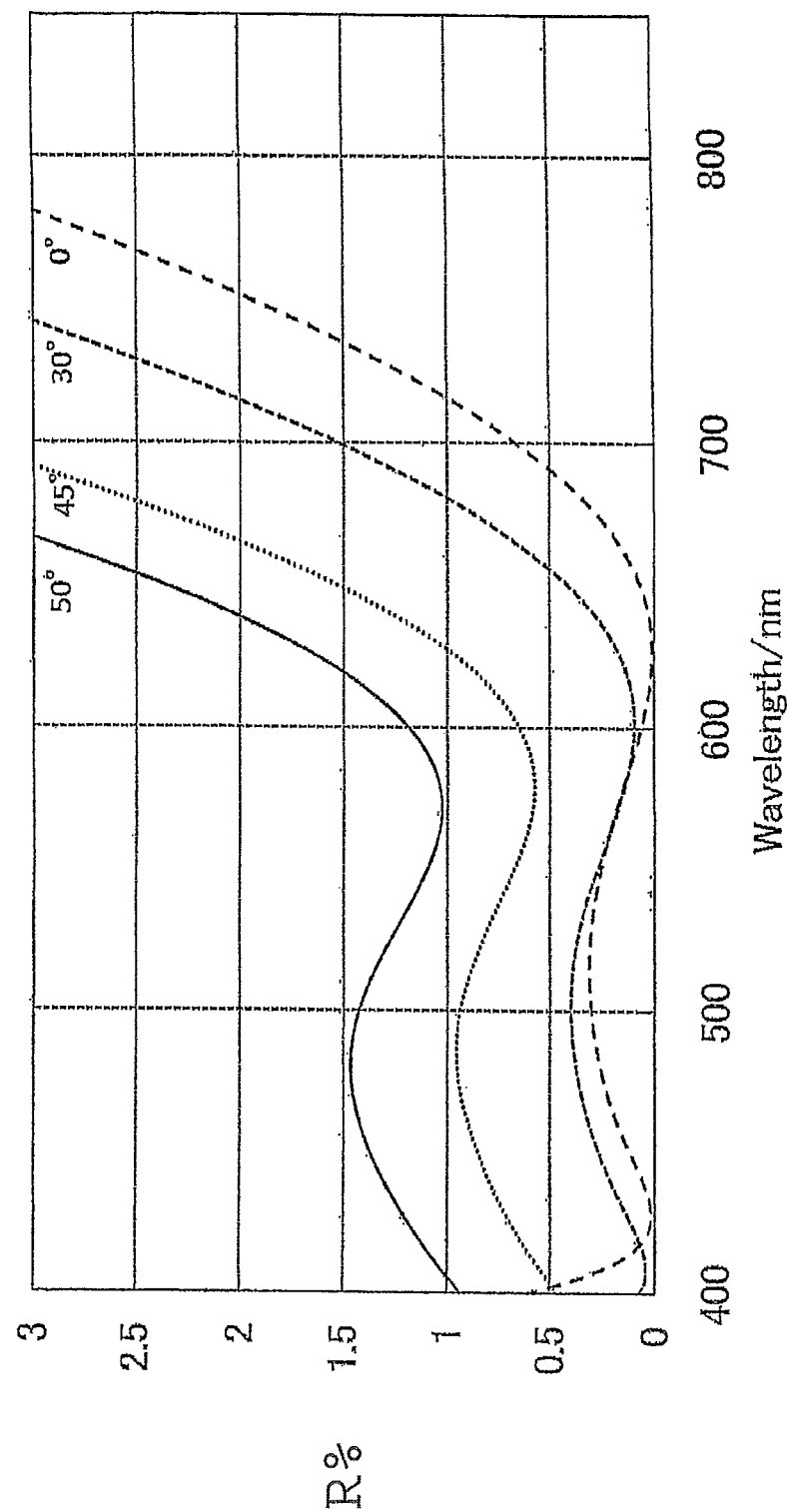
FIG. 14 is a graph showing the reflection characteristics of an antireflection film prepared in the Comparative Example 1.

Here, while the materials constituting the respective layers of the antireflection film 10 prepared in the Example 3 and the antireflection film 10 prepared in the Example 10 are the same as each other, the refractive indexes n(2) of the intermediate layers 11 are different from each other. That is, while the refractive index n(2) of the intermediate layer 11 of the antireflection film 10 prepared in the Example 3 satisfies the expression (2) representing the more preferable range, the refractive index n(2) of the intermediate layer 11 of the antireflection film 10 prepared in the Example 10 just satisfies the expression (1). As a result, the antireflection film 10 prepared in the Example 10 achieves a low reflectance in a narrower range than that in the antireflection film 10 prepared in the Example 3. Specifically, the wavelength range where the reflectance against the light beam at the incident angle of 50° was 1% or less was 400 to 700 nm in the Example 3 as shown in FIG. 6. In contrast, the wavelength range where the reflectance against the light beam at the incident angle of 50° was 1% or less was 400 to 680 nm in the antireflection film 10 prepared in the Example 10 as shown in FIG. 13. As described above, the antireflection film in which the refractive index n(2) of the intermediate layer 11 satisfies the expression (2) is more preferable since the antireflection film can achieve a lower reflectance in a wide wavelength range against a light beam having a wider range of an incident angle.

Figure 15:
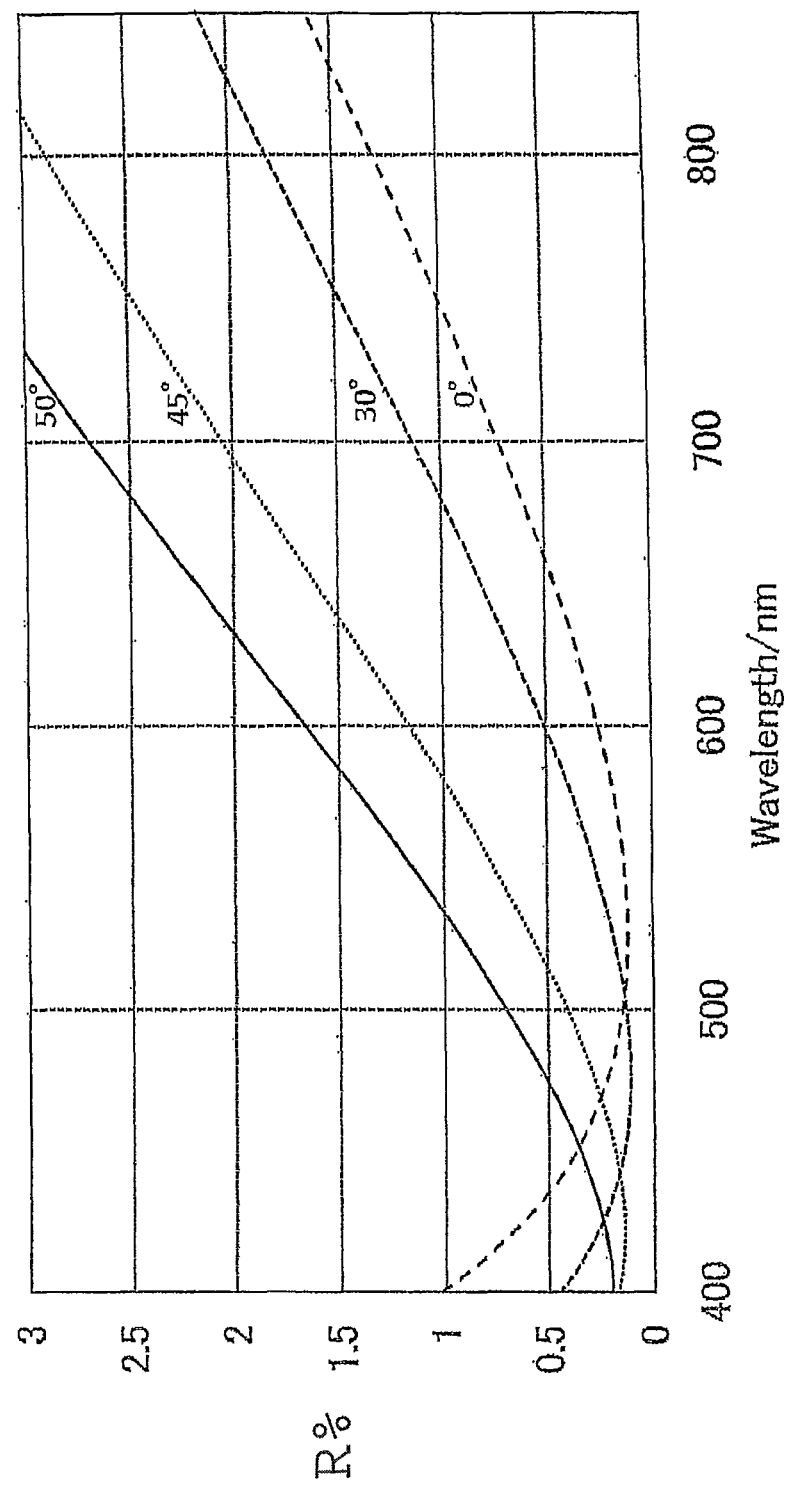
FIG. 15 is a graph showing the reflection characteristics of an antireflection film prepared in the Comparative Example 2.
Figure 16:
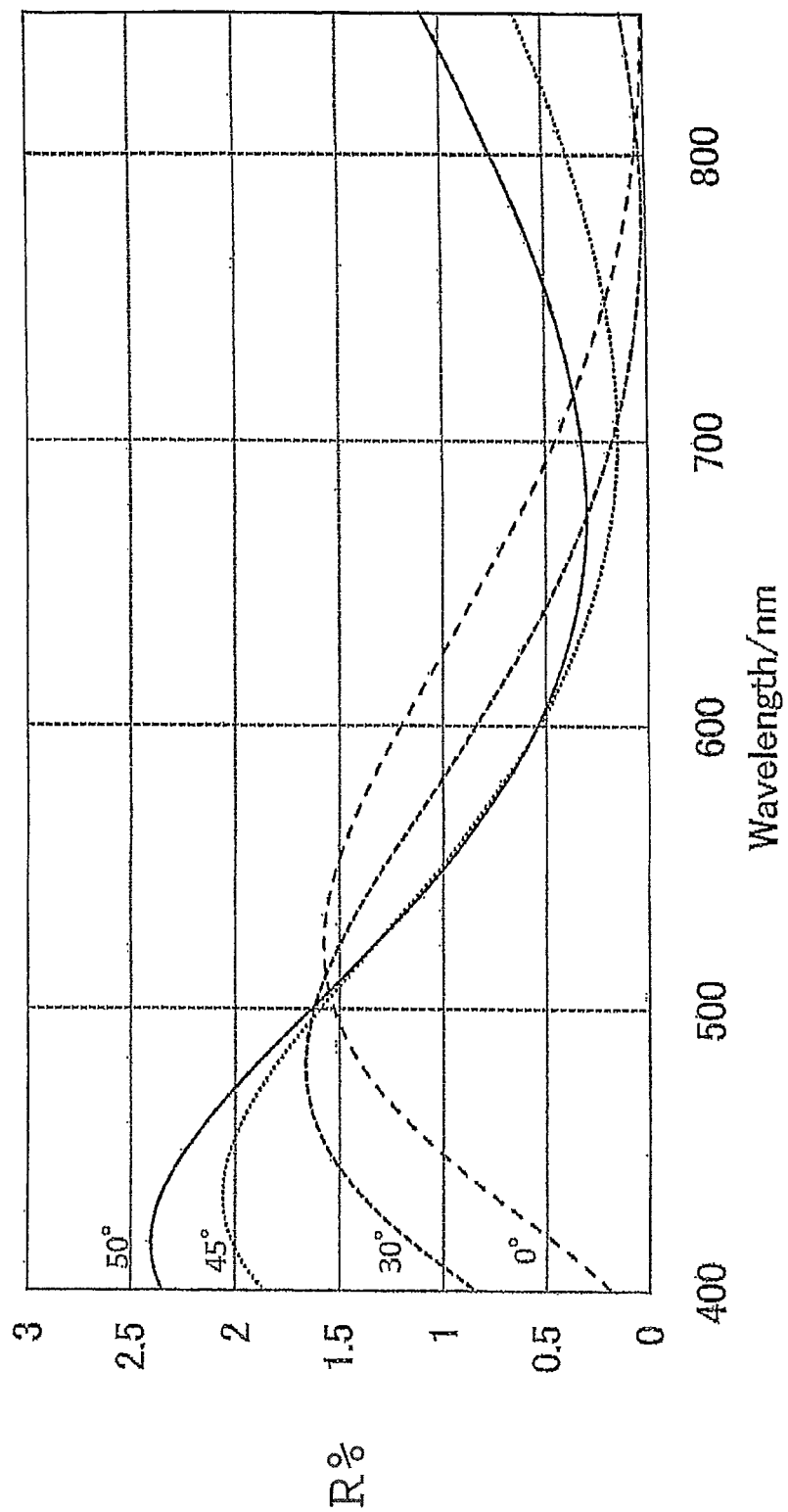
FIG. 16 is a graph showing the reflection characteristics of an antireflection film prepared in the Comparative Example 3.

In contrast, as shown in FIG. 15, in the antireflection film prepared in the Comparative Example 1, when the incident angle was 0°, the reflectance against the light beam having the wavelength of 400 to 700 nm was roughly 0.5% or less. However, when the incident angle was 30°, the wavelength range in which a reflectance of 0.5% or less could be maintained was about 400 to 660 nm. When the incident angle exceeded 45°, the reflectance against the light beam of whole wavelengths was roughly 0.5% or more, and the wavelength range in which a reflectance of 1% or less could be maintained was about 400 to 620 nm. In both of Comparative Examples 2 and 3, when the refractive index n(2) of the intermediate layer is out of the range of the expression (1), a range where a low reflectance can be achieved was also reduced as the incident angle increased, i.e. low reflectance could not be achieved against a light incident at a wide range of an incident angle.

TABLE 14

|  |  | 0° | 30° | 45° | 50° | 60° |
| --- | --- | --- | --- | --- | --- | --- |
| Example 1 | 400 nm-680 nm | 0.26% | 0.14% | 0.32% | 0.62% | 2.26% |
|  | 400 nm-700 nm | 0.26% | 0.14% | 0.41% | 0.75% | 2.50% |
|  | 400 nm-800 nm | 0.28% | 0.59% | 1.36% | 1.93% | 4.39% |
| Example 2 | 400 nm-680 nm | 0.28% | 0.20% | 0.44% | 0.80% | 2.65% |
|  | 400 nm-700 nm | 0.28% | 0.20% | 0.52% | 0.92% | 2.87% |
|  | 400 nm-800 nm | 0.30% | 0.62% | 1.43% | 2.03% | 4.61% |
| Example 3 | 400 nm-680 nm | 0.33% | 0.19% | 0.45% | 0.81% | 2.68% |
|  | 400 nm-700 nm | 0.33% | 0.19% | 0.53% | 0.93% | 2.89% |
|  | 400 nm-800 nm | 0.33% | 0.61% | 1.41% | 2.01% | 4.58% |
| Example 4 | 400 nm-680 nm | 0.36% | 0.35% | 0.67% | 1.08% | 3.15% |
|  | 400 nm-700 nm | 0.36% | 0.35% | 0.74% | 1.19% | 3.34% |
|  | 400 nm-800 nm | 0.42% | 0.75% | 1.58% | 2.21% | 4.90% |
| Example 5 | 400 nm-680 nm | 0.32% | 0.35% | 0.56% | 0.85% | 2.52% |
|  | 400 nm-700 nm | 0.32% | 0.35% | 0.58% | 0.91% | 2.64% |
|  | 400 nm-800 nm | 0.32% | 0.46% | 1.02% | 1.49% | 3.66% |
| Example 6 | 400 nm-680 nm | 0.21% | 0.09% | 0.34% | 0.62% | 2.12% |
|  | 400 nm-700 nm | 0.21% | 0.09% | 0.40% | 0.70% | 2.28% |
|  | 400 nm-800 nm | 0.21% | 0.40% | 0.97% | 1.42% | 3.51% |
| Example 7 | 400 nm-680 nm | 0.35% | 0.38% | 0.60% | 0.88% | 2.56% |
|  | 400 nm-700 nm | 0.35% | 0.38% | 0.60% | 0.93% | 2.68% |
|  | 400 nm-800 nm | 0.35% | 0.47% | 1.03% | 1.49% | 3.67% |
| Example 8 | 400 nm-680 nm | 0.39% | 0.31% | 0.54% | 0.95% | 2.95% |
|  | 400 nm-700 nm | 0.39% | 0.31% | 0.69% | 1.14% | 3.28% |
|  | 400 nm-800 nm | 0.59% | 1.07% | 2.13% | 2.85% | 5.73% |
| Example 9 | 400 nm-680 nm | 0.49% | 0.47% | 0.65% | 0.83% | 2.73% |
|  | 400 nm-700 nm | 0.49% | 0.47% | 0.65% | 0.97% | 3.03% |
|  | 400 nm-800 nm | 0.49% | 0.89% | 1.90% | 2.60% | 5.43% |
| Example 10 | 400 nm-680 nm | 0.50% | 0.14% | 0.58% | 0.97% | 2.94% |
|  | 400 nm-700 nm | 0.50% | 0.18% | 0.67% | 1.10% | 3.16% |
|  | 400 nm-800 nm | 0.50% | 0.75% | 1.59% | 2.21% | 4.84% |

TABLE 15

|  |  | 0° | 30° | 45° | 50° | 60° |
|---|---|---|---|---|---|---|
| Comparative Example 1 | 400 nm-680 nm | 0.60% | 0.99% | 2.55% | 3.59% | 7.43% |
|  | 400 nm-700 nm | 0.66% | 1.53% | 3.38% | 4.54% | 8.65% |
|  | 400 nm-800 nm | 5.69% | 7.51% | 10.26% | 11.70% | 16.11% |
| Comparative Example 2 | 400 nm-680 nm | 1.02% | 1.00% | 1.87% | 2.49% | 5.07% |
|  | 400 nm-700 nm | 1.02% | 1.14% | 2.05% | 2.69% | 5.34% |
|  | 400 nm-800 nm | 1.61% | 2.15% | 3.26% | 4.02% | 7.03% |
| Comparative Example 3 | 400 nm-680 nm | 1.57% | 1.66% | 2.06% | 2.40% | 3.96% |
|  | 400 nm-700 nm | 1.57% | 1.66% | 2.06% | 2.40% | 3.96% |
|  | 400 nm-800 nm | 1.57% | 1.66% | 2.06% | 2.40% | 3.96% |

As described above, it has been confirmed that the antireflection film 10 according to the present invention has excellent antireflection characteristics against a light beam having a wide wavelength range at a wide range of an incident angle by making the refractive index n(2) of the intermediate layer 11 to be a value in the range shown in the expression (1) or expression (2) based on the refractive index n(1) of the low refractive index layer 12 as the surface layer and the refractive index n(sub) of the base material 20.

2. Durability

It has also been confirmed that the antireflection film 10 has practically sufficient durability since the surface layer did not peeled off when the surface layer was rubbed plurality of times with a non-woven fabric.

Moreover, a high-temperature with high-humidity test (60° C., 90% RH, 240 h), a high-temperature test (80° C., 240H), and a low-temperature test (−40° C., 240H) were performed on a lens having the antireflection film 10 according to the present invention. As a result, it has been confirmed that the lens has durability since the spectral reflectance and the appearance thereof were not changed.

Since the antireflection film according to the present invention has an excellent antireflection characteristic against a light beam having a wide wavelength range at a wide range of an incident angle, the antireflection film can be favorably used for optical equipments where an incident light beam has a wide wavelength range, optical equipments using a lens having a high curvature, or the like.

Description of Symbols

10 . . . Antireflection film
11 . . . Intermediate layer
12 . . . Low refractive index layer
13 . . . Hollow silica
14 . . . Binder
20 . . . Base material
16 . . . Functional layer

The invention claimed is:

1. An antireflection film for a light beam having a wavelength of 400 nm to 800 nm inclusive, provided on a base material, comprising an optical two-layer structure composed of an intermediate layer to be provided on the base material and a low refractive index layer provided on a surface of the intermediate layer, wherein a reflectance against a light beam having a wavelength of 400 nm to 800 nm inclusive at an incident angle of 0° is 0.5% or less, and a reflectance against a light beam having a wavelength of 400 nm to 680 nm inclusive at an incident angle of 45° or less is 0.7% or less;

wherein the low refractive index layer is a layer obtained by binding a hollow silica with a binder and the low refractive index layer has a refractive index n(1) of between 1.15 and 1.24 inclusive;

wherein an optical film thickness of the low refractive index layer is between 100 nm to 180 nm inclusive;

wherein an optical film thickness of the intermediate layer is between 100 nm to 180 nm inclusive; and a refractive index n(2) of the intermediate layer satisfies a relation in an expression (1) below assuming a refractive index of the base material n(sub):

$$n(1) \times \sqrt{n(sub)} \times 0.930 \leq n(2) \leq n(1) \times \sqrt{n(sub)} \times 0.985 \quad (1).$$

2. The antireflection film according to claim 1, wherein occupied volume of the hollow silica in the low refractive index layer is between 30% by volume to 99% by volume inclusive.

3. The antireflection film according to claim 1, wherein a void portion is provided in the low refractive index layer in addition to a hollow portion in the hollow silica.

4. The antireflection film according to claim 1, wherein an average particle size of the hollow silica particles is between 5 nm to 100 nm inclusive, and outer sides of the hollow silica particles are coated with the binder.

5. The antireflection film according to any one of claims 1 to 4, wherein the refractive index n(1) of the low refractive index layer is between 1.17 and 1.23 inclusive.

6. The antireflection film according to claim 1, wherein the refractive index n(2) of the intermediate layer satisfies an expression (2) below:

$$n(1) \times \sqrt{n(sub)} \times 0.940 \leq n(2) \leq n(1) \times \sqrt{n(sub)} \times 0.970 \quad (2).$$

7. The antireflection film according to claim 1, wherein the intermediate layer is an equivalent stack having a multi-layer structure that satisfies the relation in the expression (1) at a reference wavelength.

8. The antireflection film according to claim 1, wherein the low refractive index layer is a layer formed by using the hollow silica, and a resin material or metal alkoxide as a binder component.

9. The antireflection film according to claim 1, wherein a functional layer having a refractive index n(3) of 1.30 to 2.35 inclusive and a film thickness between 1 nm to 30 nm inclusive is provided on a surface of the low refractive index layer.

10. The antireflection film according to claim 1, wherein the base material is a base material for an optical device.

11. An optical device provided with the antireflection film according to claim 1.

* * * * *